(12) United States Patent
Garofalo et al.

(10) Patent No.: US 8,310,973 B2
(45) Date of Patent: Nov. 13, 2012

(54) METHOD AND SYSTEM FOR MANAGING MULTICAST DELIVERY CONTENT IN COMMUNICATION NETWORKS

(75) Inventors: Angelo Garofalo, Turin (IT); Gabriele Ginella, Turin (IT); Eugenio Maffione, Turin (IT); Alessandro Parrinello, Turin (IT); Mario Ullio, Turin (IT)

(73) Assignee: Telecom Italia S.p.A., Milan (IT)

( * ) Notice: Subject to any disclaimer, the term of this patent is extended or adjusted under 35 U.S.C. 154(b) by 1015 days.

(21) Appl. No.: 12/087,250

(22) PCT Filed: Dec. 28, 2005

(86) PCT No.: PCT/EP2005/014085
§ 371 (c)(1),
(2), (4) Date: Dec. 2, 2008

(87) PCT Pub. No.: WO2007/073762
PCT Pub. Date: Jul. 5, 2007

(65) Prior Publication Data
US 2010/0061368 A1 Mar. 11, 2010

(51) Int. Cl.
*H04H 20/71* (2008.01)
*H04L 12/28* (2006.01)
*H04L 12/56* (2006.01)
(52) U.S. Cl. .................................... 370/312; 370/390
(58) Field of Classification Search .................. None
See application file for complete search history.

(56) References Cited

U.S. PATENT DOCUMENTS

| 7,245,614 | B1* | 7/2007 | Podar et al. ................... 370/389 |
| 7,904,940 | B1* | 3/2011 | Hernacki et al. ................... 726/1 |
| 2003/0147392 | A1 | 8/2003 | Hayashi et al. |
| 2004/0240466 | A1 | 12/2004 | Unitt et al. |
| 2004/0258003 | A1 | 12/2004 | Kokot et al. |
| 2005/0080901 | A1 | 4/2005 | Reader |
| 2005/0220132 | A1* | 10/2005 | Oman et al. ................... 370/432 |
| 2005/0281265 | A1* | 12/2005 | Sakamoto et al. ............. 370/390 |
| 2006/0156416 | A1* | 7/2006 | Huotari et al. ................... 726/27 |
| 2006/0262792 | A1* | 11/2006 | Rokui ........................... 370/390 |

FOREIGN PATENT DOCUMENTS

| EP | 1 517 518 B1 | 3/2005 |
| EP | 1966930 B1 * | 2/2010 |
| JP | 2005-328239 | 12/2005 |

OTHER PUBLICATIONS

Deering, S., "Host Extensions for IP Multicasting," Network Working Group, Request for Comments: 1112, Obsoletes: RFCs 968, 1054, pp. 1-17, (Aug. 1989).
Fenner, W., "Internet Group Management Protocol, Version 2," Network Working Group, Request for Comments: 2236, Updates: 1112, Category: Standards Track, pp. 1-24, (Nov. 1997).
Cain, B. et al., "Internet Group Management Protocol, Version 3," Network Working Group, Request for Comments: 3376, Obsoletes: 2236, Category: Standards Track, pp. 1-53, (Oct. 2002).

* cited by examiner

*Primary Examiner* — Xavier Szewai Wong
(74) *Attorney, Agent, or Firm* — Finnegan, Henderson, Farabow, Garrett & Dunner, L.L.P.

(57) ABSTRACT

A method for managing multicast delivery of data packets in communication networks includes the steps of checking join requests coming from hosts to be a part of a multicast group to determine a delivery policy associated with that host and for the requested group and associating hosts with a multicast group according to their delivery policy.

23 Claims, 17 Drawing Sheets

METHOD AND SYSTEM FOR MANAGING MULTICAST DELIVERY CONTENT IN COMMUNICATION NETWORKS

CROSS REFERENCE TO RELATED APPLICATION

This application is a national phase application based on PCT/EP2005/014085, filed Dec. 28, 2005.

TECHNICAL FIELD OF THE INVENTION

The invention relates to a method and system for managing multicast delivery content in communication networks.

BACKGROUND ART

Communications on the Internet are based on the transmission of data packets.

The data packets can be sent in different modes, including:
Unicast transmission: the packet of data is sent to a single host identified by an unicast IP address specified inside the packet;
Broadcast transmission: the packet of data is sent to all the hosts that are located on the same network or sub-network and that are identified by an IP broadcast address; and
Multicast transmission: the packet of data, is sent to a group composed of an arbitrary set of hosts identified by an IP multicast address.

Relating to the multicast transmission, it is noted that when the same packet of data has to be sent to more than one host, multicast transmission allows greater efficiency to be achieved as the number of copies of the packet in transit across a given network is minimized.

The multicast transmission is effected by using a so-called Multicast Router that is able to correctly route data packets with an IP multicast address to a set of hosts, which constitute a Multicast Group (MG).

Multicast interaction between hosts and routers are defined by protocols that allow hosts to request to join or leave multicast groups. In particular IGMP (Internet Group Management Protocol), standardized by IETF is used.

More specifically, three versions of the IGMP protocol have been standardized, namely IGMPv1 (IETF RFC 1112), IGMPv2 (IETF RFC 2236)ed IGMPv3 (IETF RFC 3376).

The first version of the protocol, namely IGMPv1, provides only two types of messages:
Membership report (or join); and
Membership query.

The hosts send a membership report specifying the multicast address of the group they are interested in joining.

When a Multicast Router receives a membership report for a group, it starts to forward the multicast traffic addressed to that group to the interface from which the membership report arrived.

Group Membership queries are periodically generated by the routers to check the presence of hosts still interested in receiving packets addressed to a given Multicast Group on the interfaces where the router was forwarding the multicast packets for that group.

Hosts that receive a membership query should send membership reports for all the groups in which they are interested. When a timeout expires without receiving membership group reports from a given interface and a given multicast group, the router stops forwarding packets related the Multicast Group on the interface.

The protocol IGMPv1 does not permit a membership query for a specific group.

To avoid useless consumption of bandwidth, a first host that receives a membership query waits for a random time before sending the membership report for the groups in which it is interested. If another host sends a membership report for a group in which it is interested during the waiting period, the first host doesn't send the membership report message for that group.

To leave a Multicast Group the hosts just avoid to reply to membership queries arriving from the Multicast Routers.

IGMPv2 protocol supports the following message types:
membership report;
membership query; and
leave message.

This protocol substantially provides, in addition to the same features of the above described IGMPv1 protocol, the capabilities to allow a host to explicitly notify its intention to leave a Multicast Group (leave message). Moreover, it is possible to send a membership query to a specific Multicast Group. Also, inside an IGMPv2 membership query, the hosts are informed of maximum time in which the router needs to receive the membership group to maintain active the group on a specific interface.

The IGMPv3 protocol, provides the source specific multicast option that allows the host to specify in the membership report message the source(s) for multicast traffic.

It is possible to specify the sources in:
exclusive mode: the host provides a list of sources from which it does not wish to receive traffic; and
inclusive mode: the host indicates a list of sources from which it wishes to receive traffic.

The Multicast Routers store the list of authorized sources to decide whether or not to route a multicast packet on a specific network segment.

US 2003/0147392 describes a process wherein, in order to make the client host capable of learning an accounting information or an authentication failure information, the accounting information or the authentication failure reason is notified from the routing device to the client host, by adding an information regarding the accounting or an information regarding a reason for the authentication failure of the client host, to a packet of a protocol based on IGMP or MLD which is a multicast control packet between the client host and the router device.

US 2005/0080901 describes a method and apparatus for authorizing Multicast Group membership based on network policies, such as machine and user identities. An end station communicates with a LAN switch over a LAN link. The LAN switch inhibits the end station from joining any Multicast Group before the end station or a user on the end station becomes authenticated. Once the end station or a user on the end station becomes authenticated, the LAN switch authorizes the end station to join one or more Multicast Groups in conformance with a Multicast Group authorization specified for the end station or the user. The LAN switch enforces the Multicast Group authorization attendant to snooping of IGMP membership reports received from the end station or processing of IGMP join messages received from a router.

OBJECT AND SUMMARY OF THE INVENTION

The Applicant has observed that, up to now, the solutions proposed in the art are not completely satisfactory.

For example, in respect of the IGMP protocol the Applicant has noted the following:

the IGMP protocol is not associated with any form of credentials and consequently it is not possible to create a pay service based on IGMP protocol: in the current embodiments, anyone who makes a request to become part of a certain Multicast Group is simply added without verifying their identity and/or the relevant authorization;

the IGMP protocol does non provide for checking the availability of the resources necessary for distributing a given data packets and consequently it may happen that even if the distribution is set up for a given item of content on a certain interface, it does not reach the user in an integral form due to unavailability of the necessary bandwidth; and the IGMP protocol does not provide for the transmission of a positive/negative response following a membership report from a host to a given group; this prevents, for example, sending information to the host regarding the causes of link failure with a given Multicast Group (network problems, authorization denied, insufficient credit, . . . ).

In respect of US 2003/0147392, the Applicant has noted the following:

the approach proposed in the above application makes the fruition of a content dependent on the successful outcome of the authentication and authorization process, which inevitably introduces latency times that are unacceptable when it is wished to allow the user to scan rapidly all possible content (zapping);

the proposed solution envisages for the introduction of a control entity on both the client and the router and therefore requires updating the software on both of the parts involved, which can be difficult to manage in the case of the clients when a broad heterogeneous installed software base already exists;

the proposed solution envisages modifying a pre-existent protocol (IGMP) in order to allow the exchange of messages between the entities installed on the client and those installed on the router of the service provider: this modification is required first of all for transmitting the credentials for user authentication and the various status messages necessary to provide feedback to the user in cases when errors occur. This approach is found to be limiting as it changes the purpose for which the protocol has been conceived; and the proposed solution does not envisage checking the availability of resources between the Multicast Router and the host that has sent the multimedia content request, which guarantees the effective usability of the transmitted multimedia content via adequate Quality of Service (QoS) parameters.

Further, in respect of US 2005/0080901 the Applicant has noted the following:

the proposed solution makes distribution of the multicast flow dependent on the successful outcome of authorization process, and therefore is inevitably subject to latency times that are unacceptable when it is wished to allow the user to rapidly scan all possible content (zapping);

the solution does not envisage checking the availability of resources between the Multicast Router and the host that has sent the multimedia content request, which guarantees the effective usability of the transmitted multimedia content via adequate QoS parameters;

the solution does not envisage user notification regarding the outcome of the membership report that was sent;

the solution does allow prepaid services to be created with disconnection upon running out of credit and the transmission of an opportune warning to the end client; and the solution is restricted to the network element on which the solution is embodied, which should be an Ethernet switch. The proposed solution is therefore not applicable to other network contexts where the clients are directly connected to a router or the transport technology is not Ethernet.

The Applicant has tackled the problem of how to guarantee efficiency in terms of network bandwidth savings and in terms of the response times perceived by the end user in the multicast transmission of data packets.

It is an objective of the present invention to provide a method for managing multicast delivery content in communication networks that overcomes at least some of the above'mentioned problems.

In particular, the present invention has the objective to provide a controlled, efficient and effective multicast delivery of content: controlled because the authorization/revocation is managed by a control entity and based on the identity of the interface or line from which the request arrives; efficient because it minimizes the occupation of network resources; effective because it enhances the user experience through the minimizing of content access times and the presentation of courtesy/alternative content.

This objective is achieved by the present invention that relates to a method for managing multicast delivery content in communication networks characterized by comprising the steps of:

checking join requests coming from at least one host to be a part of a multicast group to determine a delivery policy associated to that host for the requested group; and associating the host with a multicast group according to said delivery policy.

The present invention also relates to a system for managing multicast delivery content in communication networks, wherein a Router comprising a Replication Point supervised by a Replication Manager communicates with a plurality of hosts forming Multicast Groups, characterized by comprising:

a Control Point checking join requests to be a part of multicast group coming from at least one host to determine a delivery policy associated to that host for the requested group; and said control point instructing said replication manager for associating the host with multicast group according its delivery policy.

By delivery policy it is meant here a set of rules that guide the treatment of a content request according to specific conditions related to the user (i.e. his/her identity, his/her credit), the connectivity (the available bandwidth), the content (i.e. the necessary bandwidth and other attributes) and/or in general according to parameters that can be acquired in real time analyzing the session. These rules determine the action that will be acted (enforced) on the request i.e. authorizing the original one or modifying it with a different content reference.

Specifically, in the present solution a functional block, hereinafter referred to as Enforcement Point, can be inserted in the data/control flow and interfaces the service control infrastructure. A special module of the Enforcement Point, hereinafter referred to as Intercept Point, notifies a Control Plane of user requests regarding the fruition of multicast content and carries out the decisions made by the latter on the basis of its control logic.

The solution envisages that the Interception Point can block the join requests from the client while waiting for a response ("real-time control") from the Control Plane, or may pass immediately those join requests to the Multicast Router, independently of the response from the Control Plane ("deferred control").

On the basis of the join requests received, the Intercept Point provides appropriate notification messages to a functional block on the Control Plane, hereinafter referred to as Control Point (CP), that manages the authorization for fruition of the service. Authorization encompasses e.g. the following situations:

- access control authorization to content based on the credentials of the applicant;
- network resources availability check to guarantee the appropriate QoS levels for content fruition; and
- residual credit availability check.

Control Point sends a response regarding authorization to a module of the Enforcement Point, hereinafter referred to as Activation Point (AP). Preferably, the communication between the Activation Point and the Control Point is asynchronous. In other terms, a request-response communications paradigm is not mandatory (IP→CP, CP→AP): each entity can start communicating with another whenever it becomes necessary: whenever the Intercept Point receives a user request to join or leave a Multicast Group, it notifies this to the Control Point and whenever the Control Point wants to force a control action it will send a message to the Activation Point.

In case of deferred control, the CP authorization logic provides an implicit authorization (implied consent). The Control Point sends a message to the Activation Point only when an authorization for new access to or ongoing content fruition should be denied, redirecting the user to courtesy/alternative content, according to the reason for denying the authorization (resources not available, user not enabled to access content, insufficient credit, etc.).

Receiving the redirection messages the Activation Point sends messages to the Multicast Router that force the user's leaving the original Multicast Group and simultaneous joining a Multicast Group carrying the courtesy/alternative content.

On redirection messages, the Activation Points opportunely programs the NAT (NETWORK ADDRESS TRANSLATION) functionality, sending redirection commands to the IA module on the client access interface, for replacing the destination address field in the Multicast Courtesy/Alternative Group packets with the IP Multicast Group address expected by the client. In this way, the redirection takes place transparently to the user's application.

Based on the fact that the dialogue between the Activation Point and the Control Point can be totally asynchronous, the solution enables advanced service features such as time-limited content previews or the real-time handling of credit expiration in case of prepaid billing.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

Figure 1:
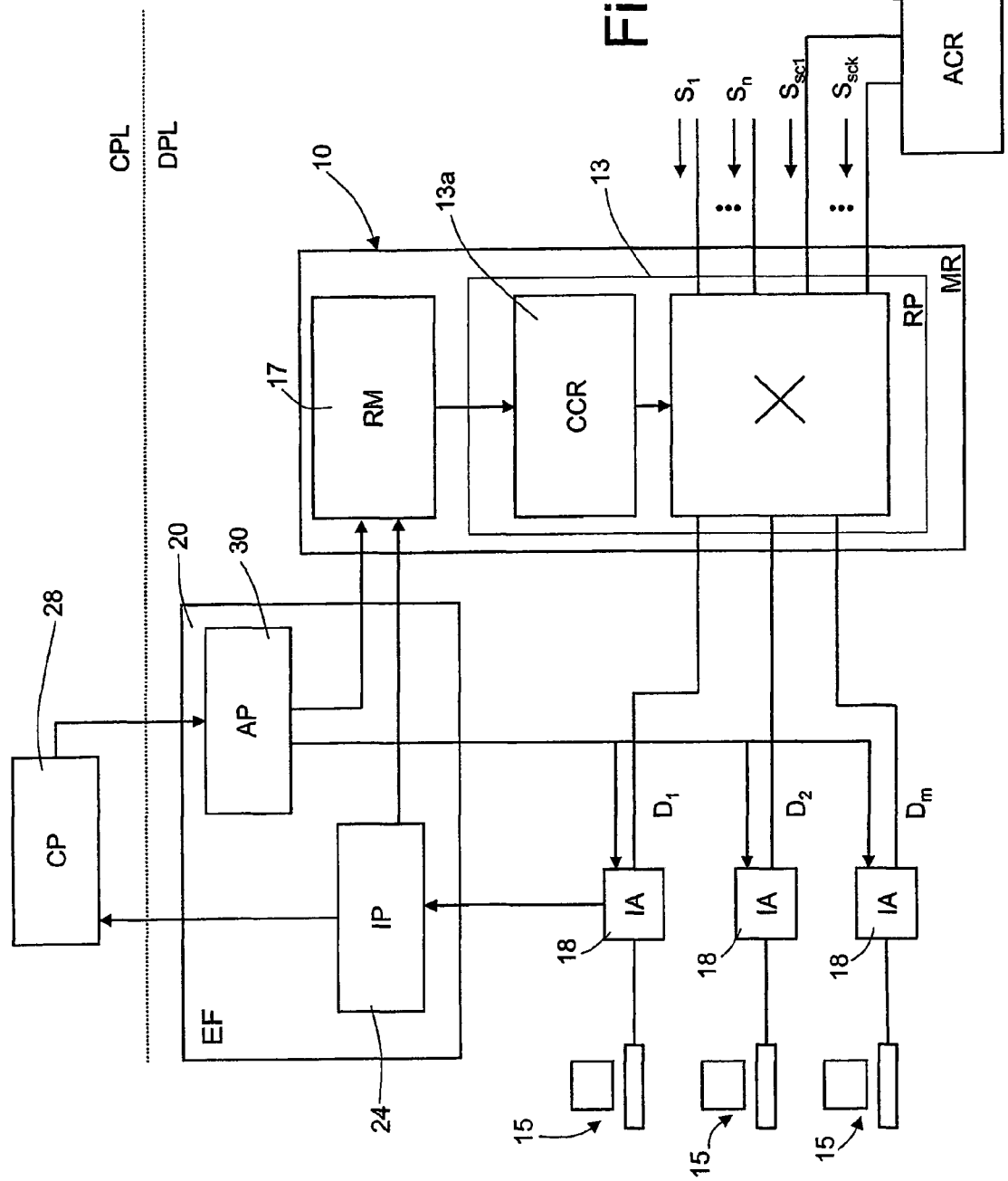
FIG. 1 shows a system implementing the method of the present invention.

FIG. 1 shows a system performing the method of the present invention.

In particular, numeral 10 indicates a Multicast Router (MR) in a Data Plane (DPL), the Multicast Router 10 including a Replication Point (RP) 13 receiving at its inputs multicast contents S1, S2, . . . , Sn, Sc1, . . . Sck, and having output ports communicating with a number of hosts 15.

The Multicast Router 10 also comprises a Replication Manager (RM) 17 (of known type and consequently not detailed) supervising the activity of the Replication Point 13.

The Replication Point 13 takes care of the physical replication of input data packets, distributing them on the ports to which the users (host 15) are connected. Depending on the implementation, the Replication Point 13 may be realized with different techniques, for instance it can consist of a software process, an ASIC, a Network Processor or any other hardware or software component specialized in packet replication.

The Replication Manager 17 manages a database 13a (Cross-connection Repository—CCR) of associations between inputs and outputs of the Replication Point 13 and generates, based on the contents of the database, the necessary primitives for opportunely programming the Replication Point 13.

An Intermediate Agent (IA) 18 is disposed on the line towards hosts 15, between each host 15 and the Replication Point 13; the Intermediate Agent 18 deals with adding an interface (e.g., line) identifier to the IGMP signalling sent by the hosts 15, in order to identify the host in an unequivocal manner and independently of the credentials provided.

Moreover, the Intermediate Agent 18 performs NAT/PAT (Network Address Translation/Port Address Translation) functionality for the multicast content if a content redirection is active at the moment for the host 15 connected to the router 10.

According to the present invention, an Enforcement Block (EF) 20 is provided to be interfaced with the service control infrastructure, in the user's signal flow (according to the example, in the IGMP flow); such Enforcement Block 20 receiving—from one side—user requests (for instance Join request or leave request) integrated with the information added by intermediated Agents 18 (only a link between one Intermediate Agent 18 and Enforcement Block 20 is shown for simplicity in FIG. 1 and in other Figures, however each Intermediate Agent 18 is assumed to be linked to Enforcement Block 20 to send user requests thereto) and communicating—from another side—with the Replication Manager 17 in order to implement allowable requests as described in the following.

The system is thus structured to be "transparent" to the Replication Manager.

With greater detail, Enforcement Block 20 comprises an Intercept Point (IP) 24 receiving user join requests to be a part of a multicast group coming from one host through Intermediate Agents 18 (for example, IGMP join) and forwarding these join requests in a form of notification messages to a Control Point (CP) 28 in a Control Plane (CPL), the Control Point 28 checking each join request to be a part of a multicast group to determine a delivery policy associated to that host and for the requested group:

Depending on the detected delivery policy associated at the host and relative to the requested multicast group, the Control Points 28 determines if the request is allowable, thus managing the authorization for fruition of a service requested from a host 15.

The Intercept Point 24 decodes the input requests in order to notify the Control Point 28 for carrying out the control operations on the requests made by the users.

The Intercept Point 24 may be provided with a database (not shown) which keeps track, for each group and for each interface, of the membership report messages received against the general-query ones sent. The above data base may be also advantageously used for handling particular hosts that leave a group without producing an appropriate message, because if following a query for a specific group no reply is received, the group is considered not existing anymore for that interface. Consequently the data base is updated and a leave command for the above group is sent to the Replication Manager.

Control Point 28, according to the detected delivery policy for an host requesting to join a particular multicast group, manages the authorization for the fruition of the service.

The meaning that is given to the term Authorization is the broadest possible. By way of example, consider the following situations:

- access control authorization to content based on the credentials of the host 15;
- network resources availability check upon request for content delivery to guarantee the appropriate QoS levels for content fruition; and
- residual credit availability check upon request for and during the fruition of content.

On the basis on the decision made by Control Point 28 authorization replies may be sent towards the Activation Point (AP) 30. Activation point 30 applies the decisions taken by the Control Point 28, communicating with the Replication Manager 17 and the Intermediate Agents 18.

The Control Point 28 can be involved in the authorization process in two different manners: Real-time authorization and Deferred authorization.

In the first case (real time authorization), the Intercept Point 24 waits for the Control Point 28 authorization, blocking the request coming from host. In this case, the join operation is performed only in presence of the authorization reply outputted by Control Point 28.

In case of deferred authorization, the authorization logic provided by the Control Point 28 is based on implied consent: i.e. the Control Point 28 only takes action on the Activation Point 30 when an authorization, for access to or current fruition of content, should be denied.

Anyway, in both cases the dialogue between Control Point 28 and Activation Point 30 is, advantageously, asynchronous; however, the dialogue may also be performed by means of a different protocol.

In case of lack of authorization deriving from the Control Point 28, the Activation Point 30 is forced to act a content redirection, to provide to the user an alternative content B from an Alternative Content Repository (ACR) 35 instead of the original requested content A. The alternative content can be different according to the reason for which authorization has been denied (resources not available, user not enabled to access content, insufficient credit, etc.). Generally the alternative content is a courtesy messages used to explain to the user the reason for which authorization has been denied. To carry out the content replacement, the Activation Point 30 perform the following tasks:

- commands to the Intermediate Agents 18 the replacement of the destination IP address, to assign to the alternative content B the same multicast address of the original content A (NAT/PAT functionality); and
- to create the opportune IGMP messages for the Replication Manager 17 to force a disassociation of the User/host 15 from the original Multicast Group and simultaneous association with a Multicast Group receiving the alternative message.

According to the IGMP messages received from the Activation Point 30, the Replication Manager 17 updates the Cross-connection Repository, thereby controlling the replication process of the data packets in a manner consistent with the restrictions imposed by the Control Point 28.

The NAT/PAT functionality, carried out by the Intermediate Agent 18, is also activated/deactivated following an explicit request from the Activation Point 30.

There is no restriction regarding the physical location of the entities above detailed (i.e. entities 24, 28 and 30). These entities are shown and discussed as logically distinct, but their physical location depends, instead, on the implementation which, according to the cases, could provide for grouping multiple logical functions into a single physical entity.

Figure 2:
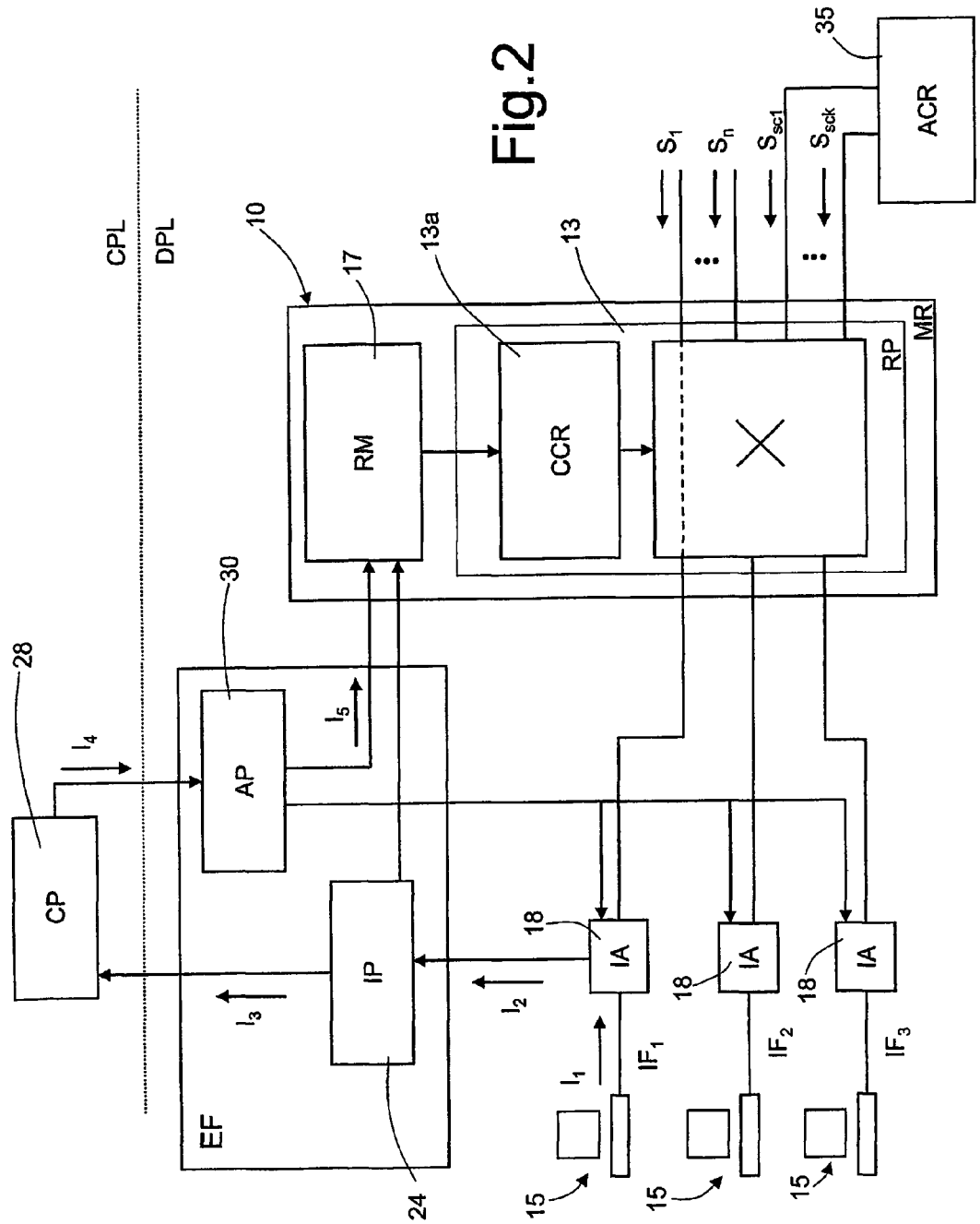
FIG. 2 shows a first example of functioning of the system according to method.

The functioning of the invention, in case of real-time control, shall be described with regard to FIG. 2 showing the signalling flow.

When a client (not shown) requires a content S1 ($I_1$=join (S1)), the request signal is intercepted from the Intermediate Agent 18 that adds the information about the interface (IF1) from which the request was received and passes the request to the Intercept Point 24 ($I_2$=join(S1, IF1)). Preferably, the interface information includes information on the line which connects the host 15 to the network.

On the basis of the required Multicast Group, the Intercept Point 24 determines whether a Real-time or Deferred control should be applied for the requested content.

Assuming a Real-time control, such as shown on FIG. 2, the request ($I_3$=Authorization Request(S1,IF)) is forwarded to the Control Point 28 that, from the type of primitive invoked, recognizes that it is a request for a Real-time control.

In case of positive verification of the admissibility, the Control Point 28 responds (i.e. generates an authorization signal ($I_4$=Authorization Reply(OK,S1,IF1)), immediately to the Activation Point 30 which will generate a join message $I_5$=Join(S1,IF1) towards the Replication Manager 17, that is exactly the same as the one originally received from the client.

In case of negative verification of the admissibility at Control Point 28 (see FIG. 3), the signal flow will be exactly the same as above outlined with the difference that the response message ($I_4$=Authorization Reply(NOK,S1,IF1,reason), will now be of a "deny" kind. Consequently, the Activation Point 30 will command to the Replication Manager (I5=Join(Sc1, IF1)) the association of the host 15 to an alternative content ($S_{SC1}$) instead of the originally request content ($S_1$). To realize this content redirection transparently for the user's application, the Activation Point commands (I6=NAT(SC1→S1, IF1)) the opportune NAT operation to the Intermediate Agent serving the user interface.

Figure 3:
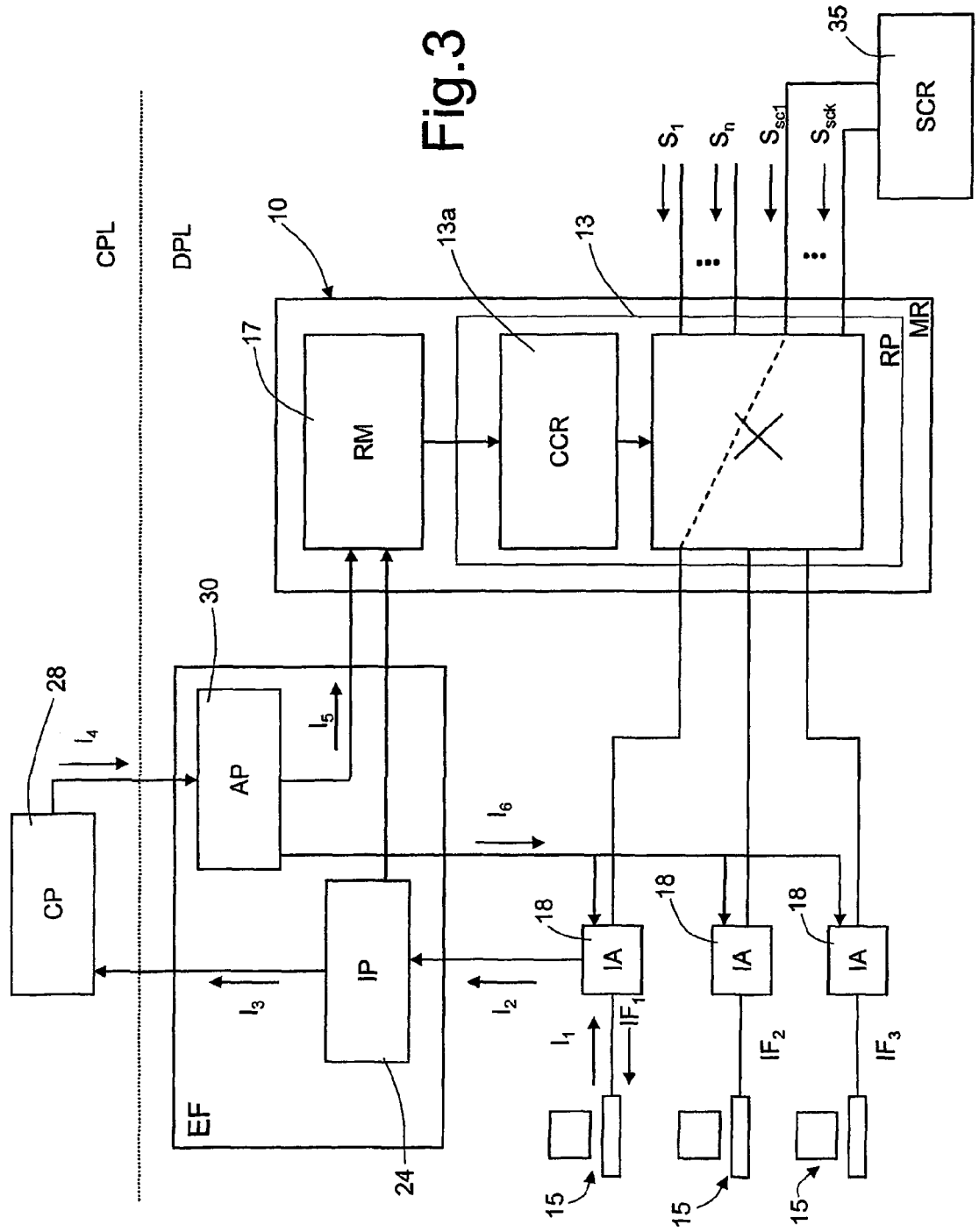
FIG. 3 shows a second example of functioning of the router according to the method.

Selection of the alternative content to provide the user with is performed by the Control Point 28 based on logic defined by the operator and implemented by a specially provided Content Manager (not shown in FIG. 3).

Figure 4:
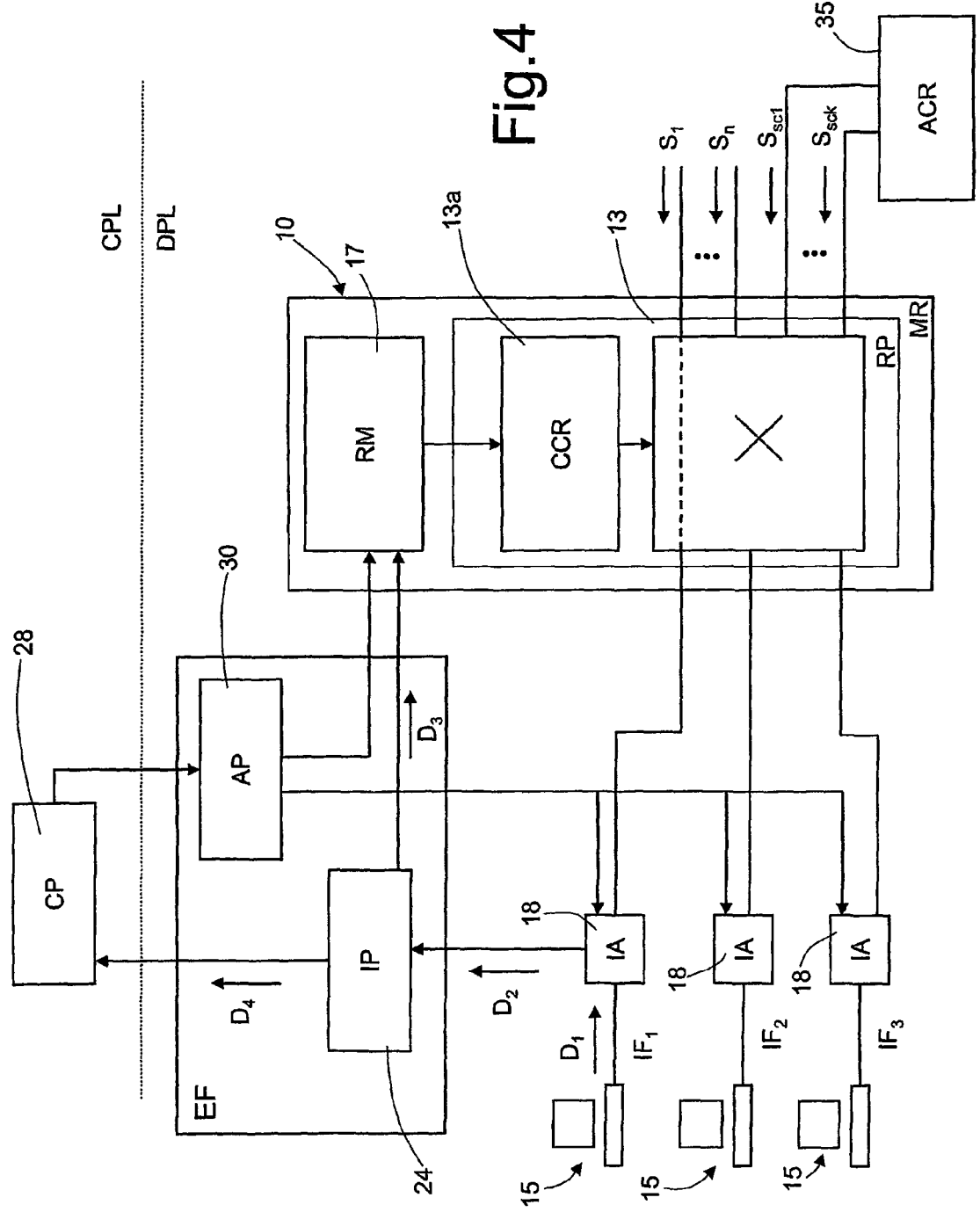
FIG. 4 shows a third example of functioning of the system according to the method.
Figure 5:
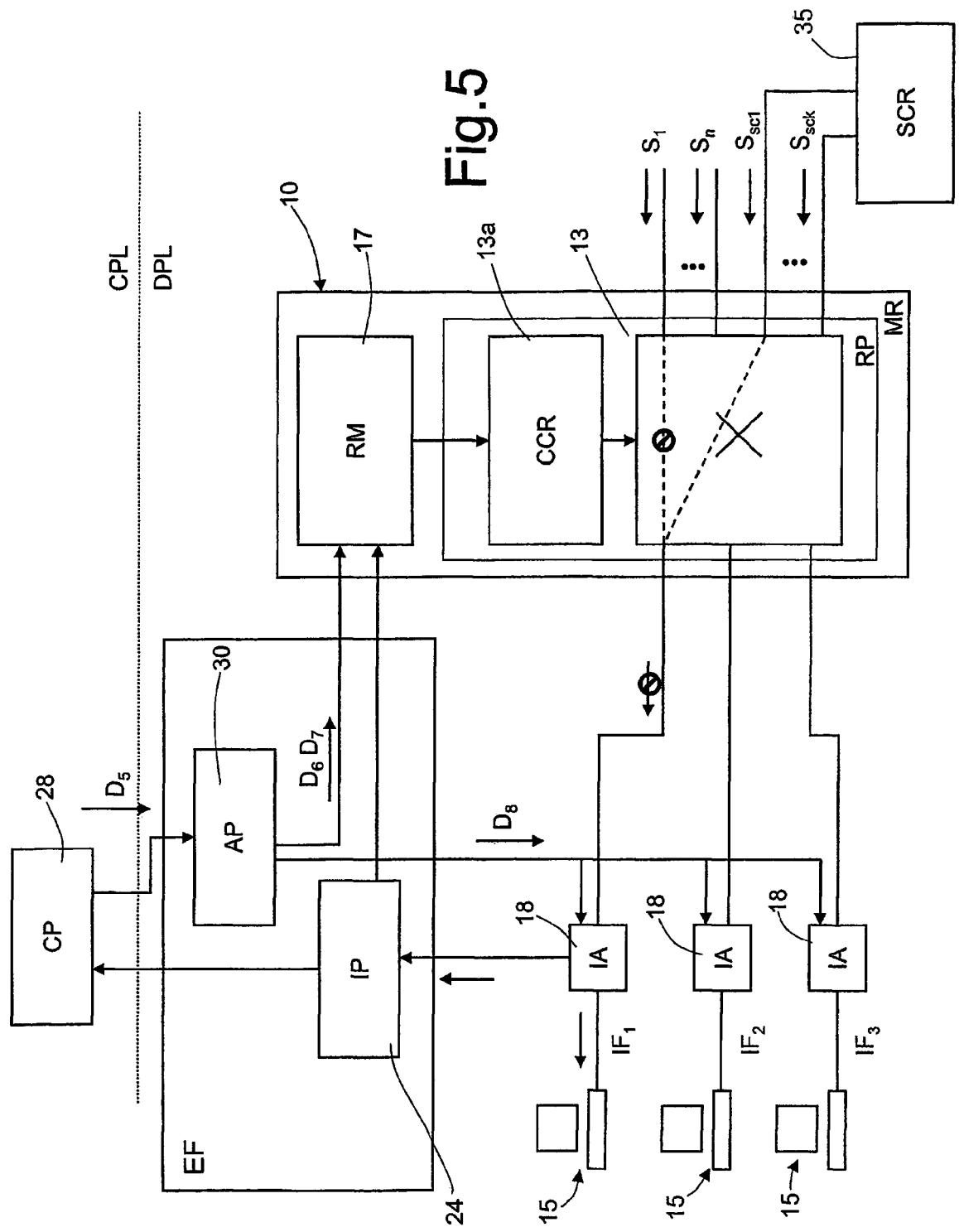
FIG. 5 shows a fourth example of functioning of the system according to the method.

The case of deferred control is shown with regard to FIGS. 4 and 5.

The operations, in case of deny of authorization, are similar to the ones described with regard to FIG. 3; however the redirection operations are implemented by the Control Point 28 in a manner totally asynchronous and unconnected to a specific user request.

In case of deferred control, the Intercept Point 28 doesn't block the user signaling waiting for a response from the Control Plane.

Based on its own internal logic, the Control Point 28 establishes if a user is no longer enabled for the fruition of certain content and, in consequence, acts on Replication Manager 17 through Activation Point 30 by redirecting to the user an alternative content Sc1, . . . Sck that may be related to the interruption in fruition.

As shown in FIG. 5, the redirection is carried out by the Activation Point 30 sending commands D6=Leave(S1,IF1), D7=Join(Sc1,IF1) to the Replication Manager 17 for the user to Leave (D6=Leave(S1,IF1)) the content currently being consumed and Join the alternative content (D7=Join(SC1, IF)).

In order to guarantee that the performed redirection is transparent to the client, the Activation Point 30 will also command (D8=NAT(Sc1→S1,IF1)) the network address translation NAT for the surrogate flow.

Having analysed the working of the method in the case of requests for membership of a Multicast Group (in the two modes, Real-time and Deferred), we shall now analyse the expected behaviour of the solution in case of a user leaving from a Multicast Group with a specific request to leave from a content was being consumed (Leave).

When the user asks to leave, the application in use is completely unaware of whether that being consumed is the originally requested content or an alternative content.

The leave request L1=Leave(S1) that arrives from the client will therefore always make reference to the originally requested Multicast Group, even if an alternative content is arriving to the user. For the content delivery system two cases are possible, depending from the fact that the user was been previously redirect to an alternative content or not. The management of these two cases differs slightly, as will be described below.

Figure 6:
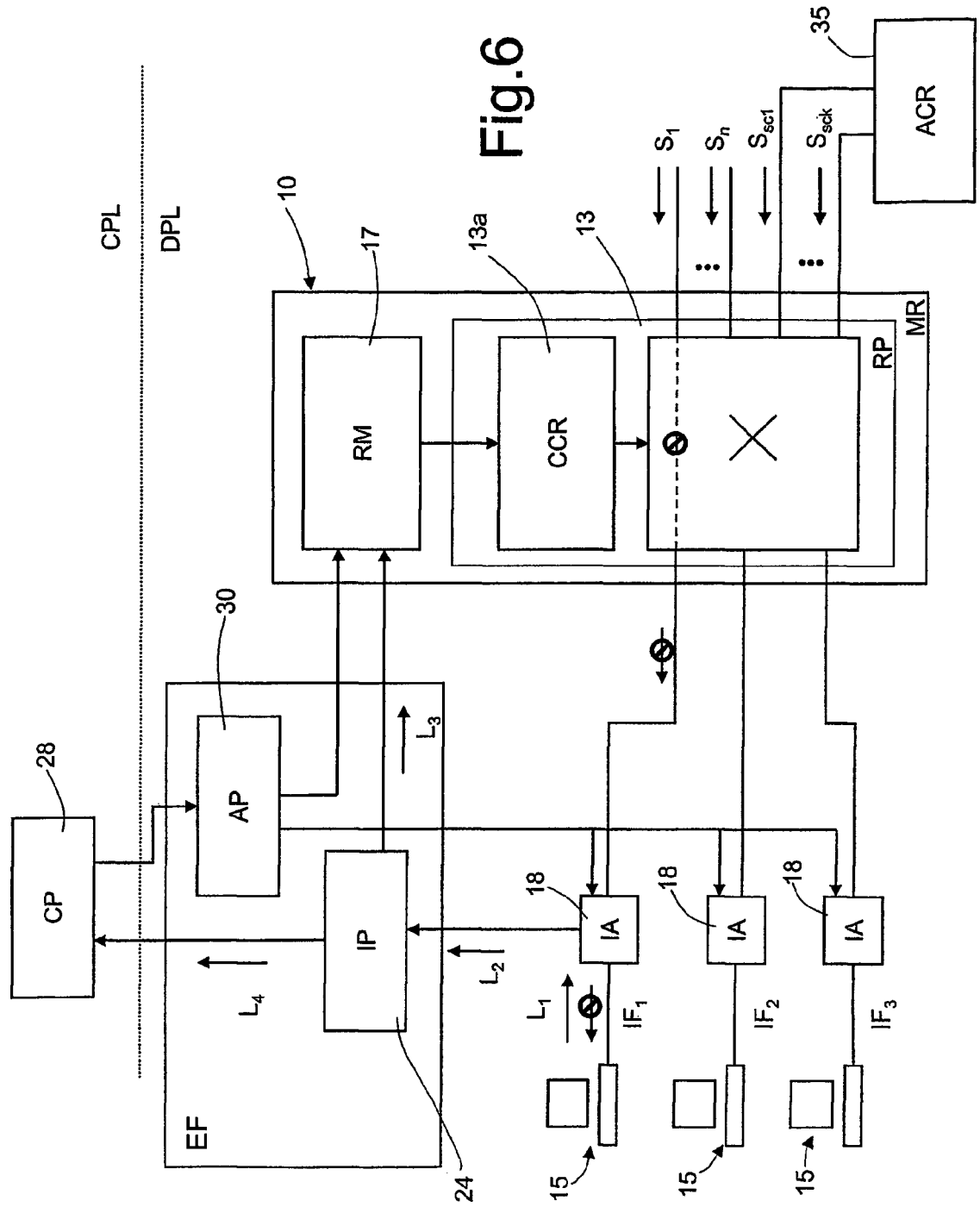
FIG. 6 shows a fifth example of functioning of the system according to the method.

The Leave from non-alternative content is managed as shown in FIG. 6.

With regard to FIG. 6, when the client makes the Leave request(L1=leave(S1)), the leave signal is passed from the Intermediate Agent 18 to the Intercept Point 24.

As no Network Address Translation (NAT) rules are applied on Intermediate Agent 18, the Intermediate agent 18 lets the Leave signal (L2=leave(S1,IF1)) pass through without modifying the Multicast Group to which it refers.

Upon receiving the Leave signal, the Intercept Point 24, in turn, lets it continue directly to the Replication Manager 17 (L3=leave(S1,IF1)), but also notifies the Control Point 28 about it (L4=stop_fruition(S1,IF1)).

Figure 7:
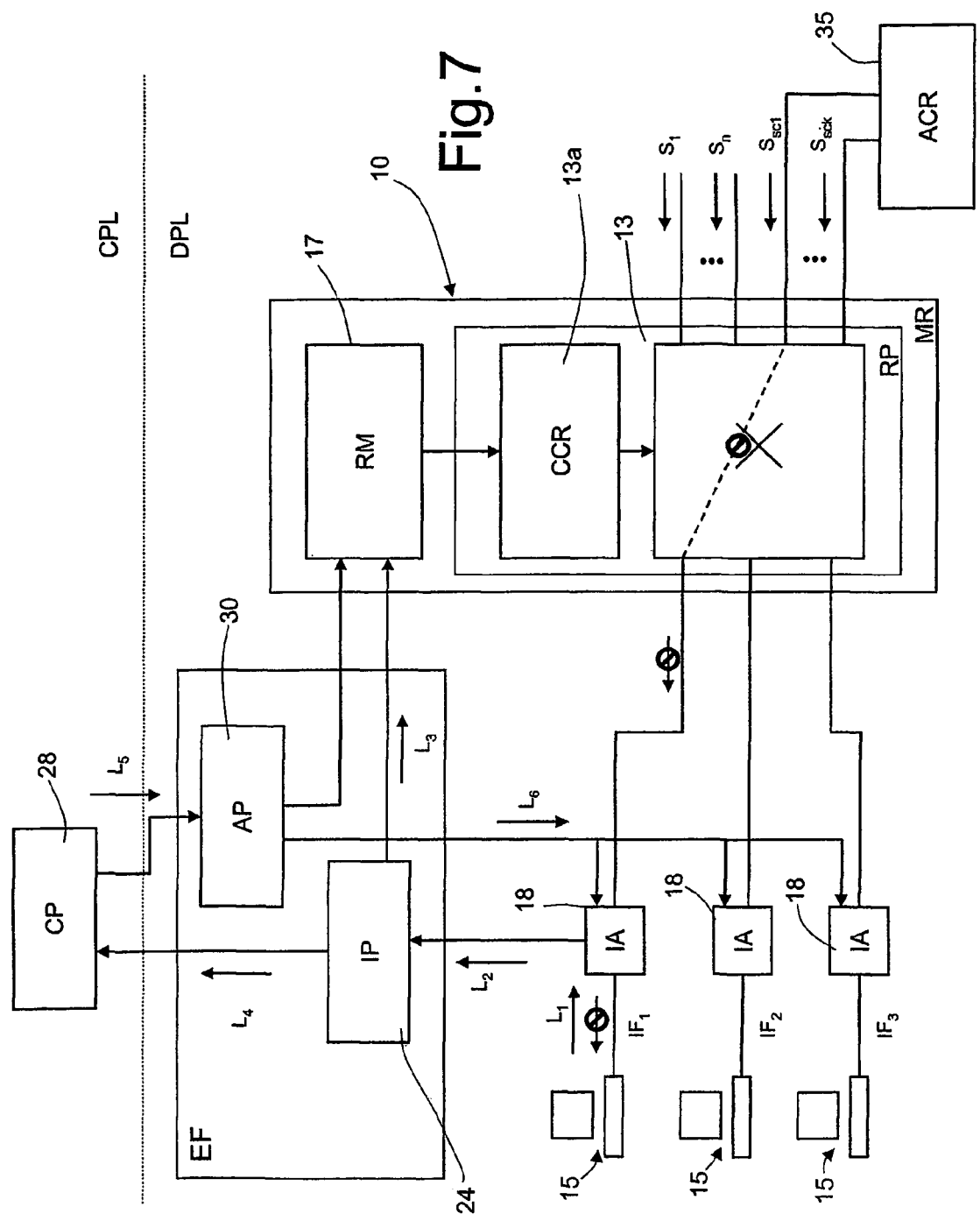
FIG. 7 shows a sixth example of functioning of the system according to the method.

In the case where the user is instead consuming an alternative content, the working of the method is that described in FIG. 7.

For motives of transparency regarding the previously described content substitution process, the request (L1=leave (S1)) will arrive from the host 15 (client) for the original multicast group.

The Intermediate Agent 18, based on the configured NAT rule, will translate the leave request (L2=Leave(Sc1,IF1)) substituting the original address with the address of the alternative content, which the user was actually consuming.

Following this, as in the previous case described with regard to FIG. 6, the Intercept Point 24 will forward the translated Leave message to the Replication Manager 17 (L3=Leave(Sc1,IF1)) and notify the Control Point 28 (L4=Stop_Fruition(Sc1,IF1)).

However, unlike the previous case, the Control Point 28 will now send a command (L5=Stop_alternative_Content_ Fruition(Sc1,IF1)) to the Activation Point 30 to remove the NAT rule, which the Activation Point 30 will carry out by opportunely instructing the Intermediate Agent 18 (L6=Remove_NAT(Sc1,IF1)). Therefore possible future Join requests coming from the same host will not use the NAT rule as default.

As well as being expressly requested by the host, the termination of content fruition can also be caused by the expiry of timeouts associated with keep-alive messages, useful to the Multicast Router for determining if a host, towards which it is supplying replicated content, is actually still interested in the content or not. Without these mechanisms, the Multicast Router could risk continuing to replicate content indefinitely, even in the case where nobody is interested anymore in this content (because the host that made the request has encountered a hardware or software problem for example).

As described in the background section, IGMP implements these mechanisms on the basis of membership query messages that the hosts should confirm by sending opportune membership report messages.

Therefore, in the same way as the working of the system is tied to the correct management of explicit Leaves, the implicit ones tied to this type of mechanism should also be correctly detected and handled.

Figure 8:
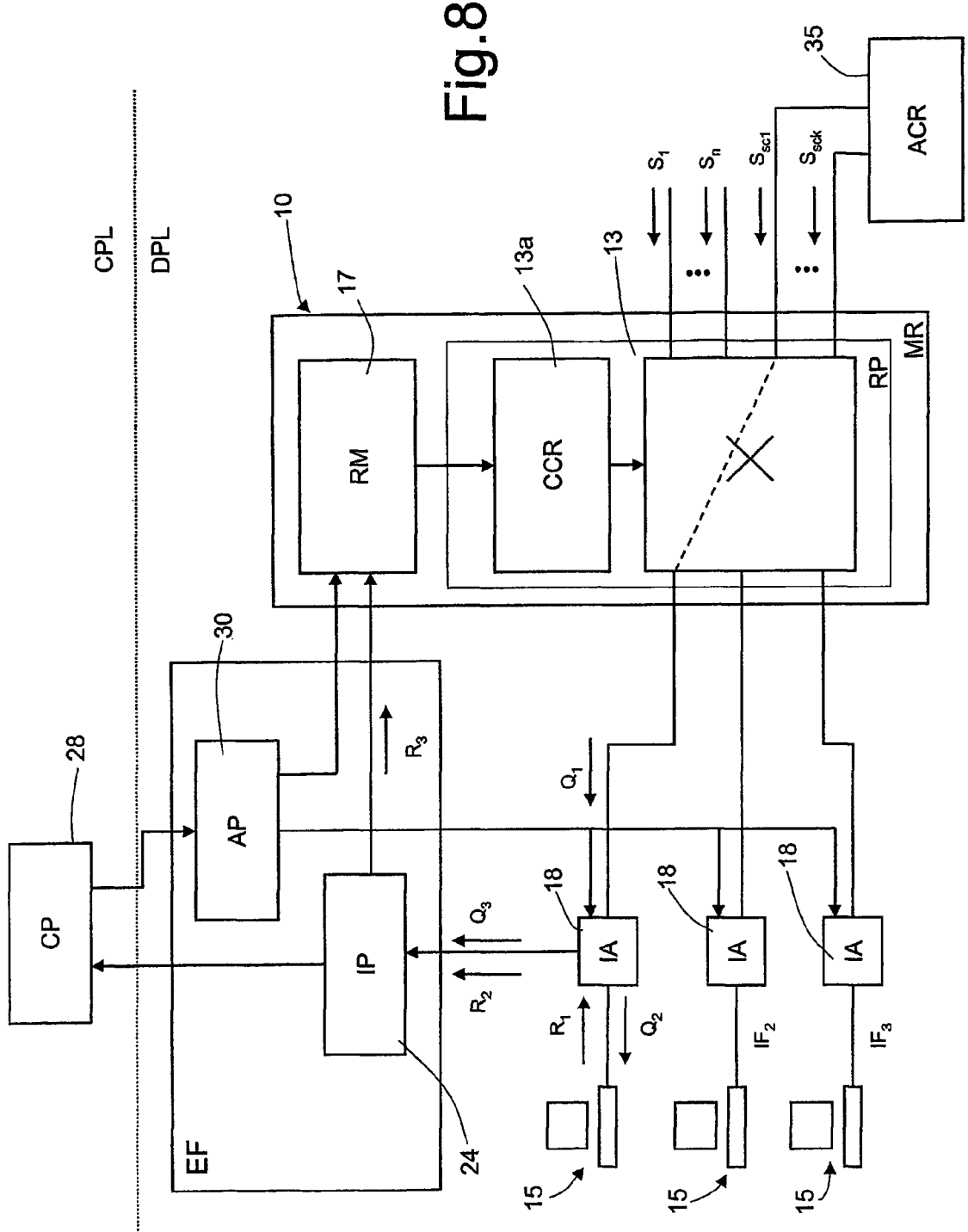
FIG. 8 shows a seventh example of functioning of the system according to the method.

In the specific case of IGMP, the solution works as detailed below (see also FIG. 8).

As long as the membership query messages Q1=Query (Sc1) sent from Replication Point 13 towards hosts 15 are confirmed by reply membership report messages R1=Report (Sc1) coming from interrogated host 15, the Intercept Point 24 limits itself to transparently forwarding the reports R2=Report(Sc1,If1) to the Replication Manager 17 so that the Multicast Router 10 does not suspend content delivery.

Figure 9:
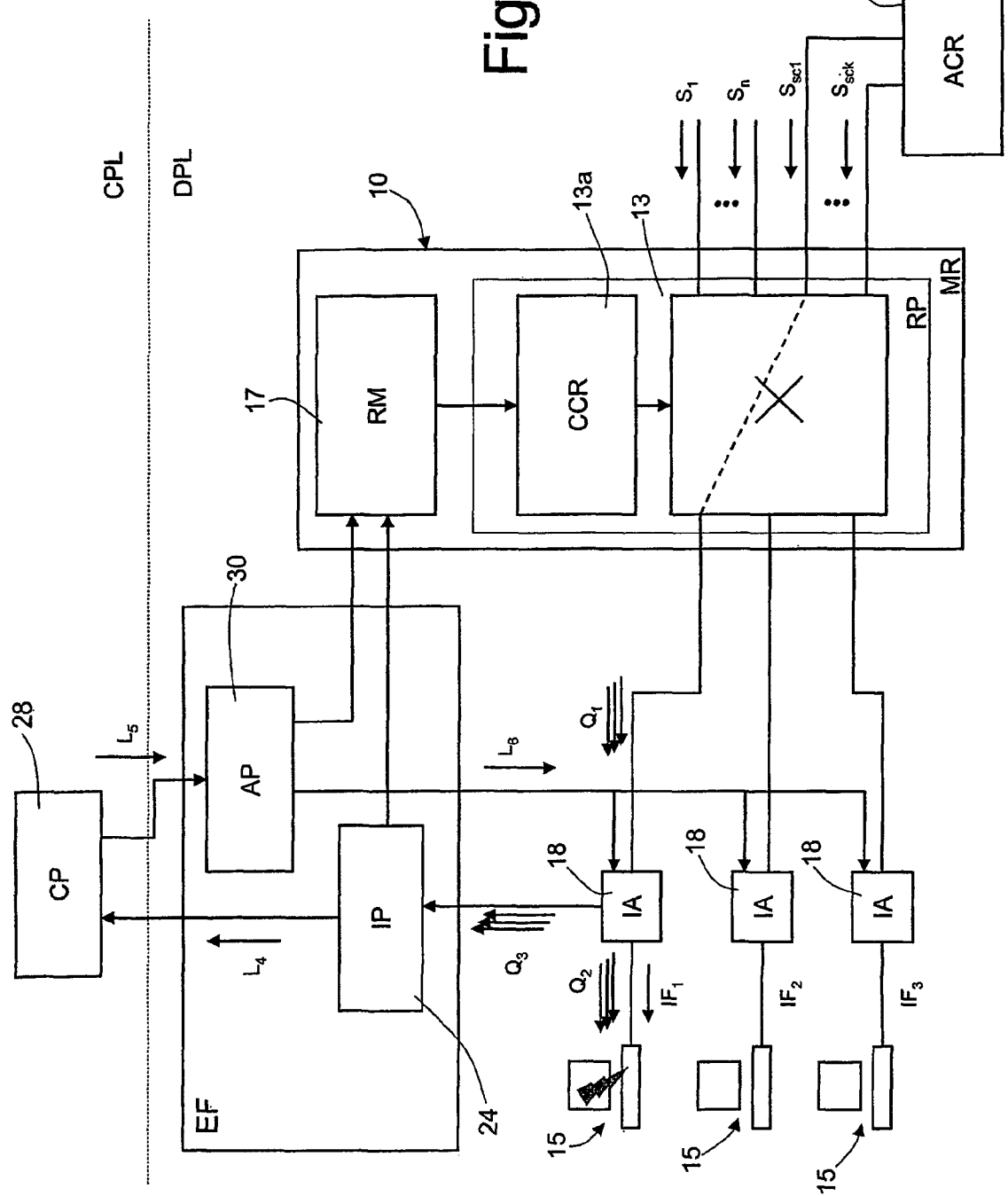
FIG. 9 shows a eight example of functioning of the system according to the method.

Instead, should for any reason the host 15 not confirm the membership query messages Q1=Query(Sc1) (FIG. 9) sent to it with membership report messages, when a timeout expires the Intercept Point 24 notifies (L4=Stop_Fruition(Sc1,IF1)) the Control Point 28 of the stop in content fruition by the user, as above already described in the case of the explicit Leave by the client. If the content in fruition was alternative content (as shown in FIGS. 8 and 9), the Control Point 28 will also command the removal of the NAT rule (L6=Remove_NAT (Sc1,IF)).

As already disclosed the logical entity that operates on the Control Plane is the Control Point 28.

The Control Point 28 is entrusted with control over the delivery of the service requested or currently being consumed by the user.

As already explained, the controlling functions performed by Control Point 28 according to the detected delivery policy associated to the host requesting a join to a multicast group may be of different kind and may consist in one or more of the following:

- controlling content access authorization by an host 15 based on his credentials;
- controlling network resource availability when the request to deliver content is made by an host 15, in order to guarantee the appropriate QoS levels during content fruition;
- controlling residual credit when the request to deliver content is made by a host 15 during content fruition.

From the architectural viewpoint, the Control Point 28 functions as a coordinator between the various entities involved, each of which operates a specific control.

The Control Point 28 is characterized by a customization component to meet the operator's needs for service control.

The type of control entities utilized depends, in fact, on the type of delivery policy that the operator wishes to realize.

Figure 10:
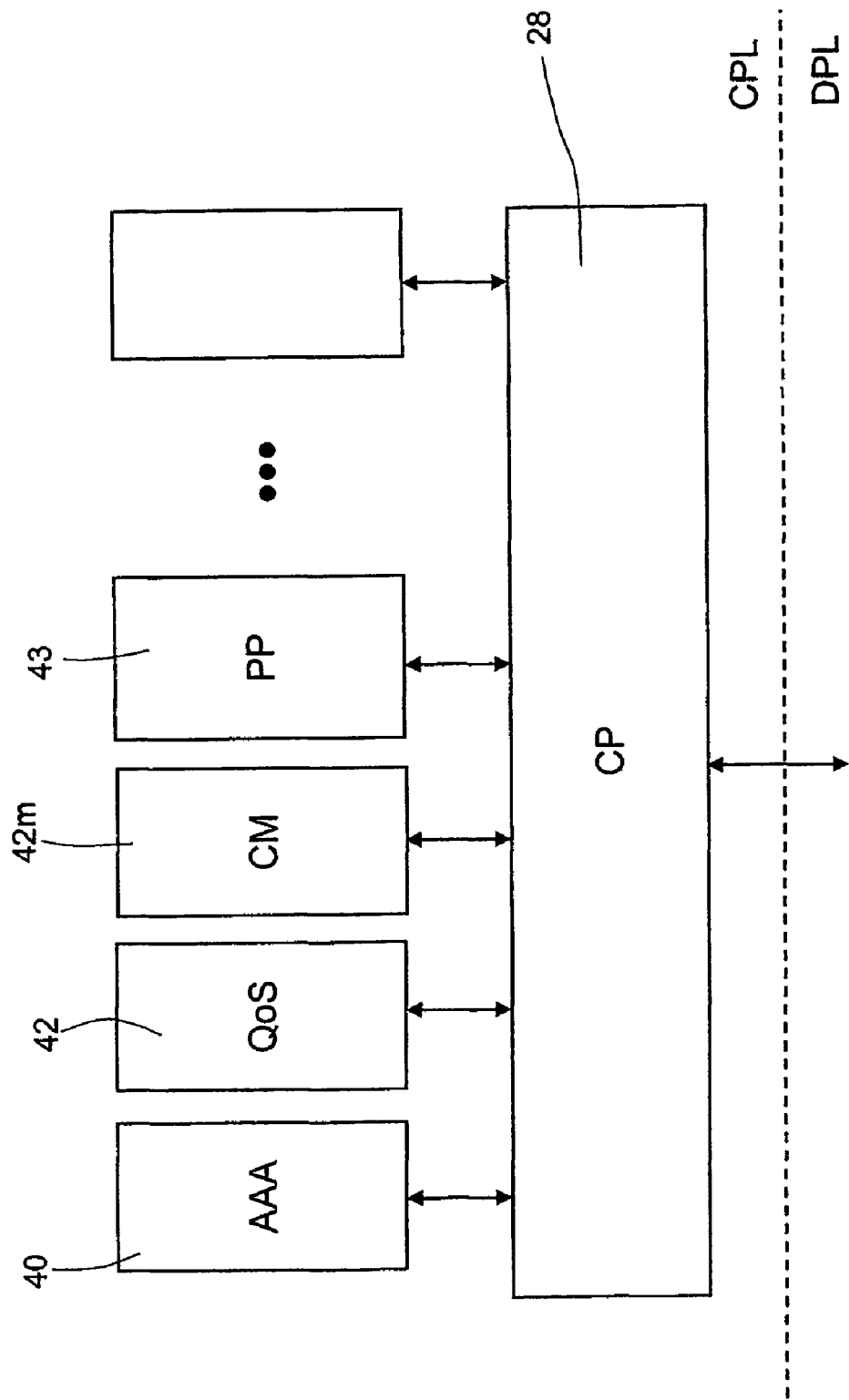
FIG. 10 show an example of structure of the System Control Plane.

For example, one could envisage (FIG. 10):

- an AAA Server 40 to manage matters related to authentication, authorization and basic accounting. As it is known an AAA server is a server program that handles user requests for access to computer resources and provides authentication, authorization, and accounting (AAA) services. The AAA server typically interacts with network access and gateway servers and with databases and directories containing user information. The current standard by which devices or applications communicate with an AAA server is the Remote Authentication Dial-In User Service (Radius); and
- a QoS Server 42 for managing QoS issues. As it is known with QoS term it is meant the ability to provide consistent, predictable data service delivery to satisfy customer application requirements.

Several characteristics qualify QoS, including the capability to minimize delivery delay, reduce delay variations, and provide consistent data throughput capacity;

- a Server 42m realizing a Content Manager (CM); and
- a Server 43 for managing billing on a prepaid basis (PP).

The customisation of the Control Point 28 is also to be such as to guarantee interfacing with said control entities, which are not always equipped with standard interfaces.

In the case of the AAA Server 42 for example, protocols such as Radius or Tacacs could be used.

However, the same protocols are not suitable for the other types of Servers 42 and 43 indicated above, for which there is not always an established access standard.

For example, access to the QoS Server 42 can take place in various modes: SOAP/XML (with proprietary API interface), http, Diameter, etc.

Control Point 28 manages at least the authorization for access to content based on the delivery policy determined in each case. The delivery policy can be based, in particular, on one or more of the following:

- content, such as required bandwidth and/or other attributes;
- connectivity, such as available bandwidth and/or QoS (resource availability);
- specific conditions related to the user, such as identity and/or billing information (residual credit); and
- other parameters that can be acquired in real time by analyzing the session.

If authorization fails, the Control Point 28 acts as outlined above forcing the interruption of content delivery (forced Leave from a Multicast Group) or redirecting the user to an alternative content (Sorry movies for example).

Control Point 28 also manages other things including:

- management of accounting events (start, stop);
- content Redirection based on user information (user type or terminal capability) or on localization information;
- manage of termination of content fruition by a user.

The Control 28 makes the above functionalities available to the rest of the framework via a standard interface, through which the Control Point 28 can exercise its function of controller.

All necessary information are provided at the interface level for identifying:

- the type of event (Authorization Request, Accounting start, . . . );
- the user to which it refers (Request Interface, . . . );
- the content to which it refers (Multicast Group, identifier from EPG, . . . ).

Opportune logics for managing the request are defined for each function that the Control Point 28 is called upon to manage. For example, for the management of a content access authorization request, the Control Point 28 is instructed on which control servers to contact (and through which primitives to do so), how to use the information that is passed to it, how to use the responses of the various control servers that are contacted and, based in these, how to produce the response message to the request.

In the following part, some specific operation performed by Control Point 28 shall be detailed.

Figure 11:
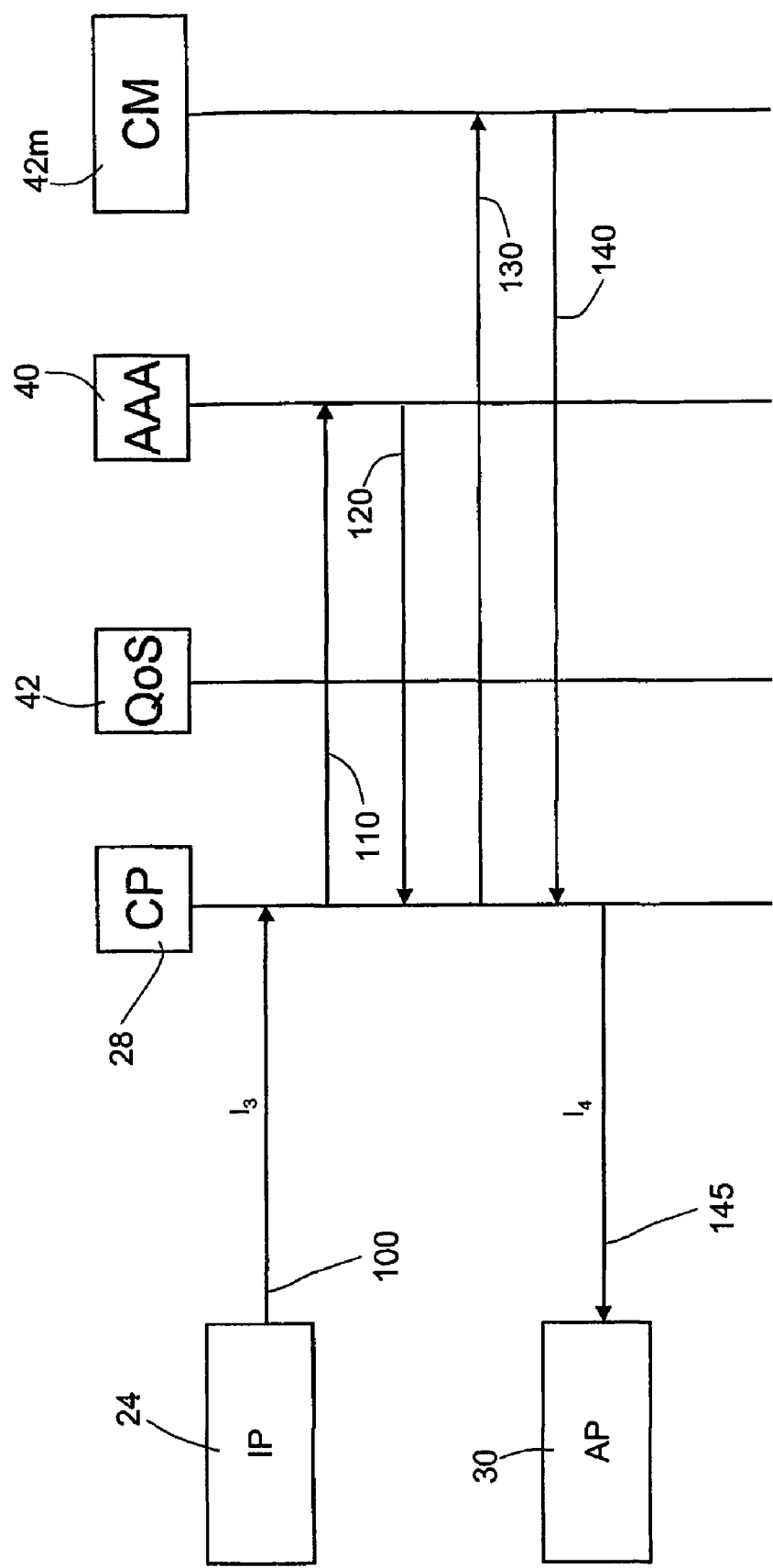
FIGS. 11-17 describe specific control operations performed by the method according to the invention.

FIG. 11 shows the operation performed by Control Point 28 in case of on-line authorization denied due to lack of authorization for applicant.

More particularly the operations are the following:

- an authorization request 100 is transferred from the Intercept Point 24 to the Control Point 28;
- the Control Point 28 transfers 110 the authorization request to a AAA server 40 where the allowability of the request is checked;
- the AAA server 40 finds the request not allowable and generates a deny signal 120 transferred to the Control Point 28;
- the Control Point 28 gives instructions 130 to the Content Manager 42m for the determination of an alternative content;
- the indication 140 of the alternative content to use is sent to the Control Point 28;
- the Control Point 28 provides the Activation Point 30 with a negative Authorization Reply 145 in which it is specified the alternative content to be provided to the user instead of the requested one, and the reason for which the authorization was denied.

Figure 12:
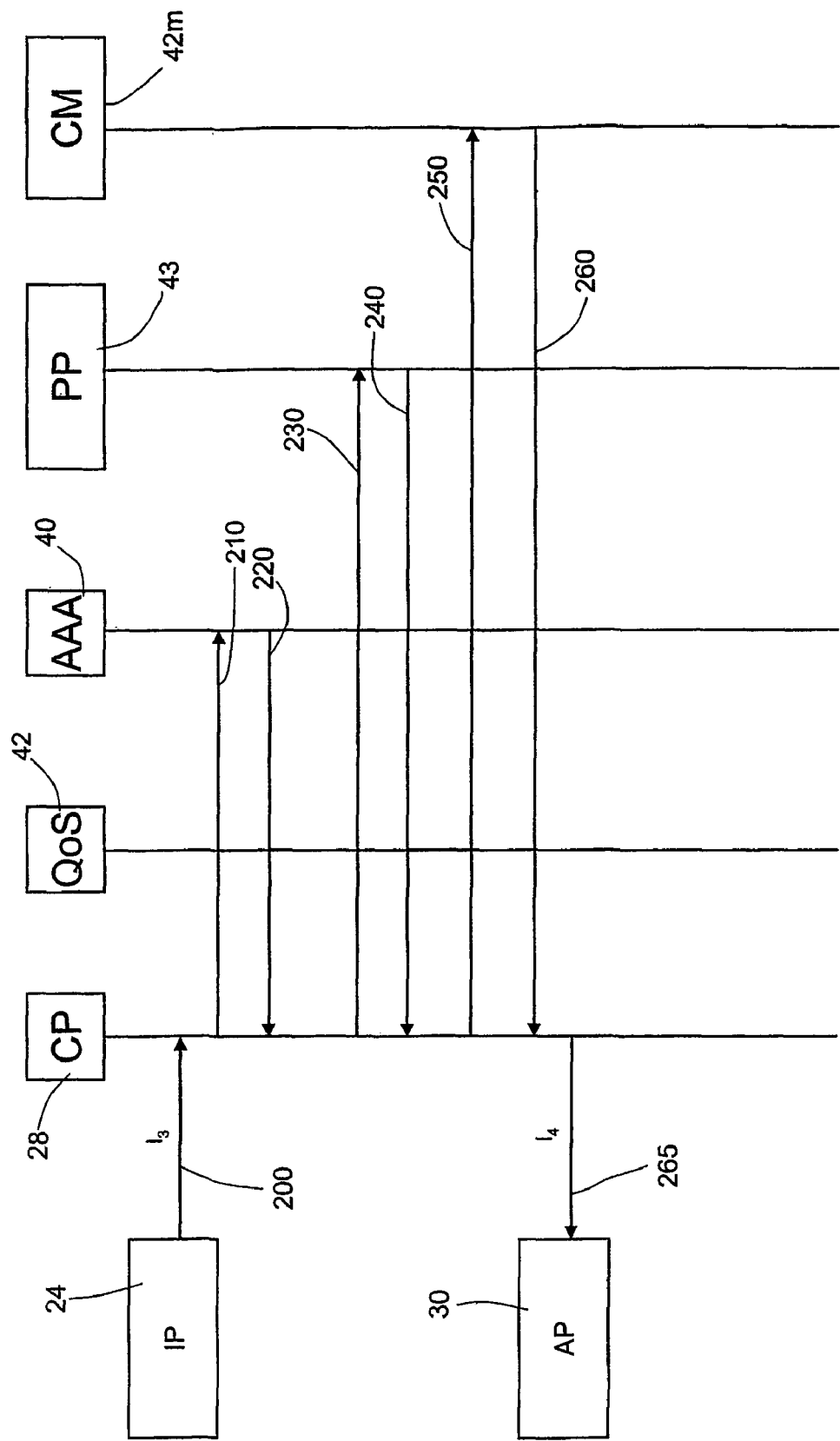

FIG. 12 shows the operation performed by Control Point 28 in case of on-line authorization denied due to insufficient credit of a prepaid user.

More particularly the operations are the following:

- an authorization request 200 is transferred from the Intercept Point 24 to the Control Point 28;
- the Control Point 28 transfers 210 the authorization request to a AAA server 40 where the allowability of the request is checked;
- the AAA server 40 finds the request allowable as first instance and generates a OK signal 220 transferred to the Control Point 28;

the Control Point 28 activated by the OK signal 220 generates a request of credit check 230 directed towards the server 43 having data of prepaid users;

the server 43 generates a deny signal 240 (i.e. the user has no credit anymore) transferred to the Control Point 28;

the Control Point 28 gives instructions 250 to the Content Manager 42*m* for the determination of an alternative content; and the indication 260 of the alternative content to use is sent to the Control Point 28;

the Control Point 28 provides the Activation Point 30 with a negative Authorization Reply 265 in which it is specified the alternative content to be provided to the user instead of the requested one, and the reason for which the authorization was denied (i.e. credit insufficient for the content fruition).

Figure 13:
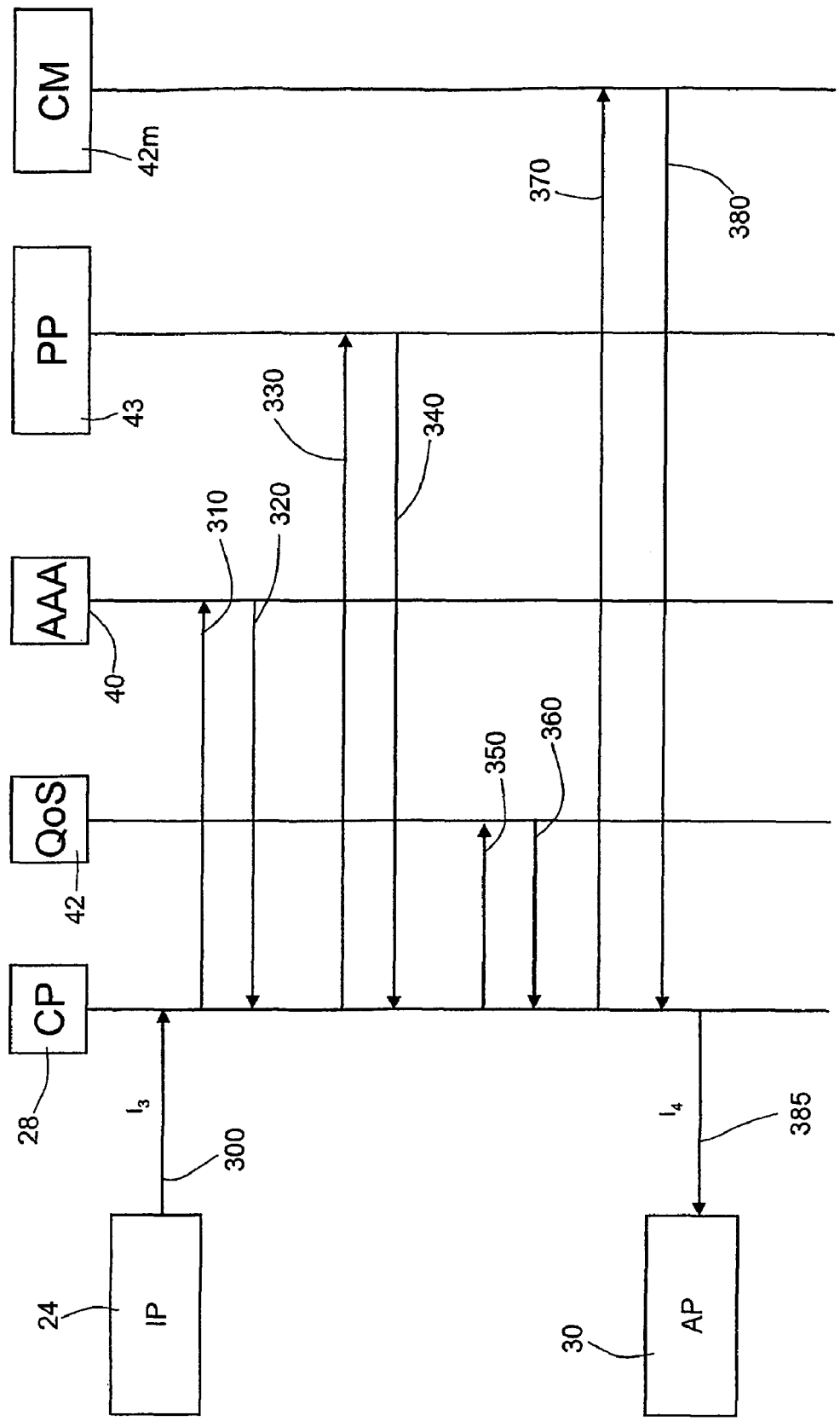

FIG. 13 shows the operation performed by Control Point 28 in case of on-line authorization denied due to network resource unavailability.

More particularly the operations are the following:

an authorization request 300 is transferred from the Intercept Point 24 to the Control Point 28;

the Control Point 28 transfers 310 the authorization request to a AAA server 40 where the allowability of the request is checked;

the AAA server 40 finds the request 310 allowable (prepaid user recognized) as first instance and generates a OK signal 320 transferred to the Control Point 28;

the Control Point 28 activated by the OK signal 320 generates a request of credit check 330 directed towards the server 43 having data of prepaid users;

the server 43 generates an OK 340 (i.e. the user has credit) transferred to the Control Point 28;

the Control Point 28 generates a request of availability of sources and interfaces 350 directed towards a QoS server 42;

the QoS server 42 generates a deny signal 360 (i.e. because there aren't enough available resources to guarantee a satisfactory content fruition) transferred to the Control Point 28;

the Control Point 28 gives instructions 370 to the Content Manager 42*m* for the determination of an alternative content; and the indication 380 of the alternative content to use is sent to the Control Point 28;

the Control Point 28 provides the Activation Point 30 with a negative Authorization Reply 385 in which it is specified the alternative content to be provided to the user instead of the requested one, and the reason for which the authorization was denied (i.e. resources not available at the moment).

Figure 14:
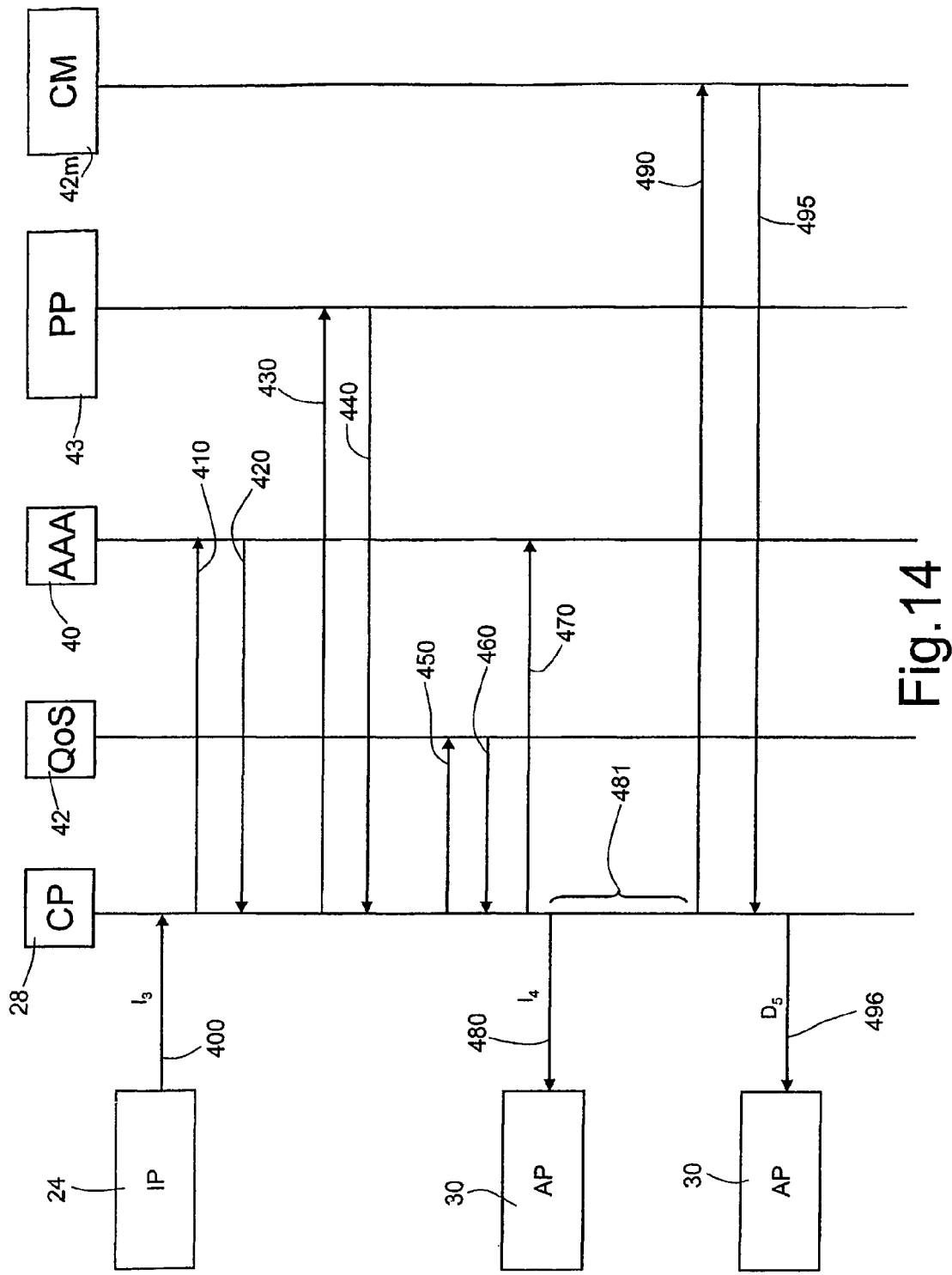

FIG. 14 shows the operation performed by Control Point 28 in case preview concession for un-purchased content of a prepaid user.

More particularly the operations are the following:

an authorization request 400 is transferred from the Intercept Point 24 to the Control Point 28;

the Control Point 28 transfers 410 the authorization request to a AAA server 40 where the allowability of the request is checked;

the AAA server 40 finds the request 410 allowable (prepaid user recognized—the prepaid user has not purchased the content but is allowed to have a preview) and generates an OK signal 420, transferred to the Control Point 28;

the Control Point activated by the OK signal 420 generates a request of credit check 430 directed towards the server 43 having data of prepaid users;

the server 43 generates an OK 440 (i.e. the user has credit) transferred to the Control Point 28;

the Control Point 28 generates a request of availability of sources and interfaces 450 directed towards a QoS server 42;

the QoS server 42 generates an OK signal 460 transferred to the Control Point 28;

the Control Point, activated by the OK signal 460, requests 470 to a AAA server 40 to burn the preview license (to avoid that the user uses the preview possibility more than one time);

the Control Point sends to Activation Point 30 an authorization 480 for supplying the preview for a preview period 481;

at the end of the preview period 481 the Control Point 28 gives instructions 490 to the Content Manager 42*m* for the determination of an alternative content;

the indication 495 of the alternative content to use is sent to the Control Point 28;

the Control Point 28 sends to the Activation Point 30 a Redirect message 496 indicating the alternative content to be provided to the user, and the reason for which the redirection occurs (i.e. preview timer expired).

Figure 15:
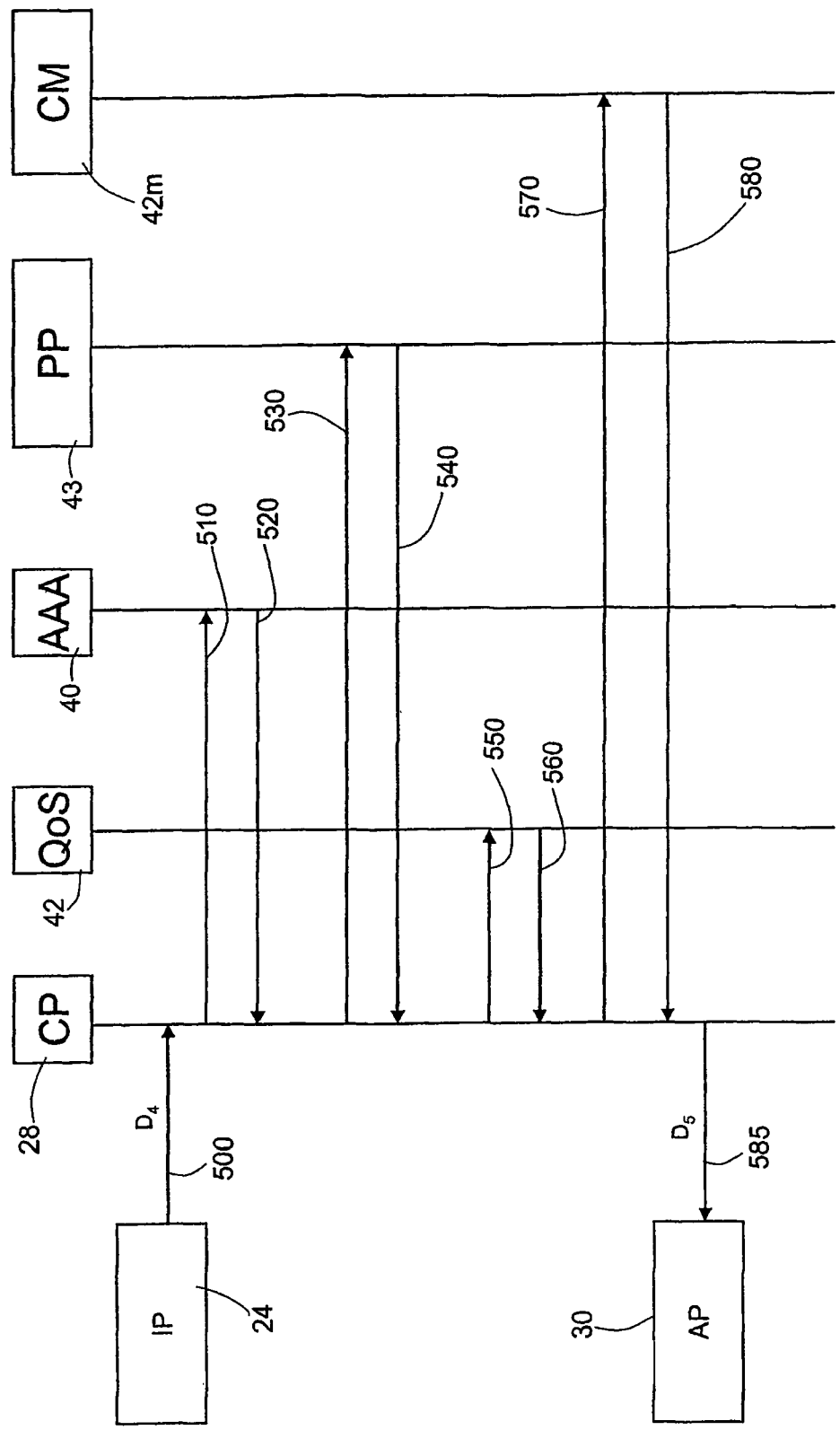

FIG. 15 shows the operation performed by Control Point 28 in case of preview denial for un-purchased content of prepaid user.

More particularly, the operations are the following:

an authorization request 500 is transferred from the Intercept Point 24 to the Control Point 28;

the Control Point 28 transfers 510 the authorization request to a AAA server 40 where the allowability of the request is checked;

the AAA server 40 examines the request 510 and generates a signal 520 acknowledging that the user has been already allowed to have a preview—the signal 520 is transferred to the Control Point 28;

the Control Point activated by the signal 520 generates a request of credit check 530 directed towards the server 43 having data of prepaid users;

the server 43 generates an OK 540 (i.e. the user has credit) transferred to the Control Point 28;

the Control Point 28 generates a request of availability of sources and interfaces 550 directed towards a QoS server 42;

the QoS server 42 generates an OK signal 560 transferred to the Control Point 28;

the Control Point 28 gives instructions 570 to the Content Manager 42*m* for the determination of an alternative content;

the indication 580 of the alternative content to use is sent to the Control Point 28;

the Control Point 28 sends to the Activation Point 30 a Redirect message indicating the alternative content to be provided to the user, and the reason for which the redirection occurs (i.e. preview already used for the requested content).

Figure 16:
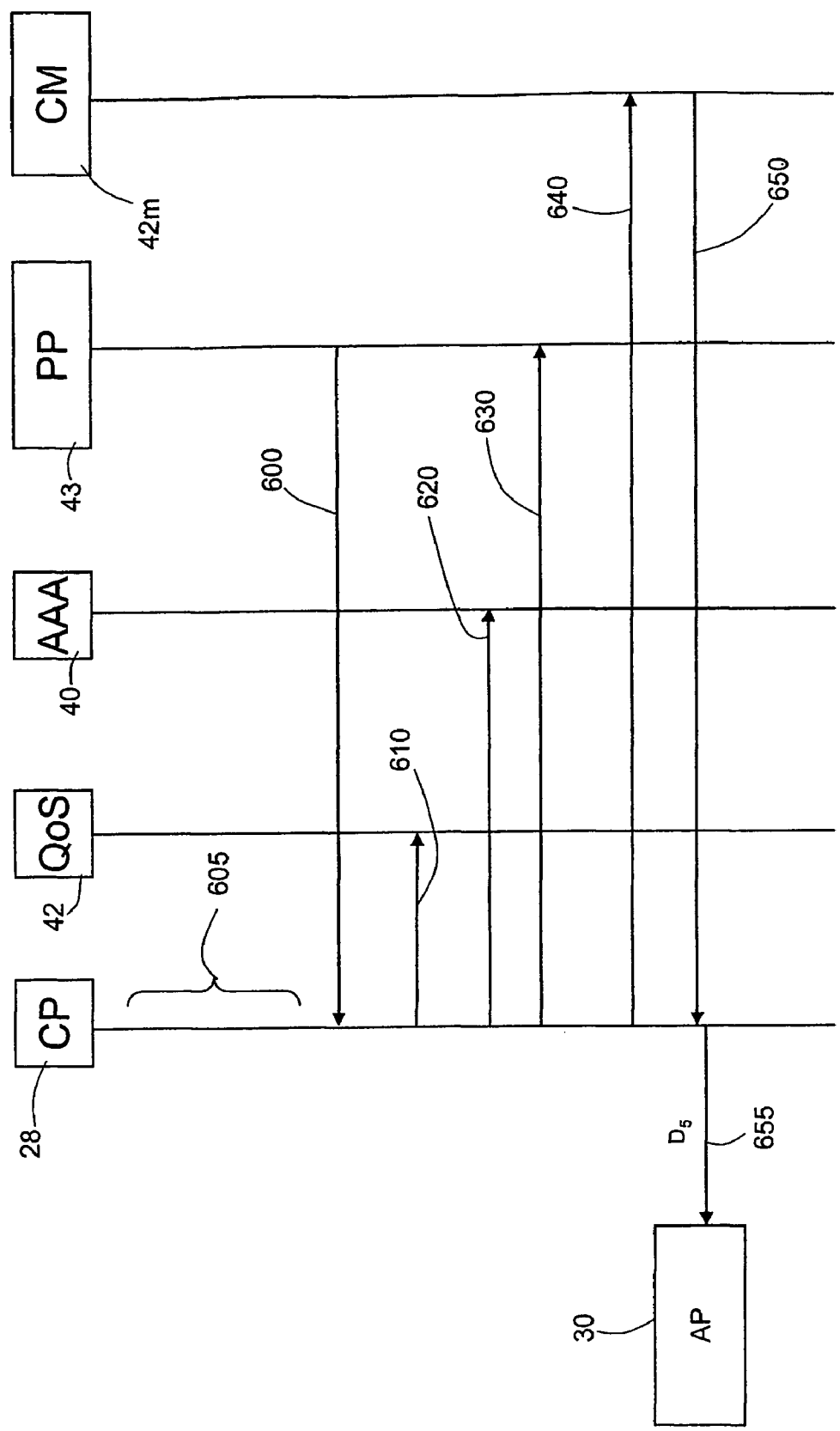

FIG. 16 shows the operation performed by Control Point 28 in case of a condition of insufficient credit is detected during a content fruition 605 for a prepaid user.

More particularly, the operations are the following:

a signal 600 of insufficient credit is sent to Control Point 28 from a server managing the prepaid users;

the band allocation that was requested in order to guarantee the QoS content is released 610;

the Control Point 28 generates a signal 620 to a AAA interface 40 for stopping the accounting;

the Control Point 28 generates a signal 630 to the server 43 having data of prepaid users for stopping billing;

the Control Point 28 gives instructions 640 to the Content Manager 42*m* for the determination of an alternative content;

the indication 650 of the alternative content to use is sent to the Control Point 28;

the Control Point 28 sends to the Activation Point 30 a Redirect message 655 indicating the alternative content to be provided to the user, and the reason for which the redirection occurs (i.e. credit expired).

Figure 17:
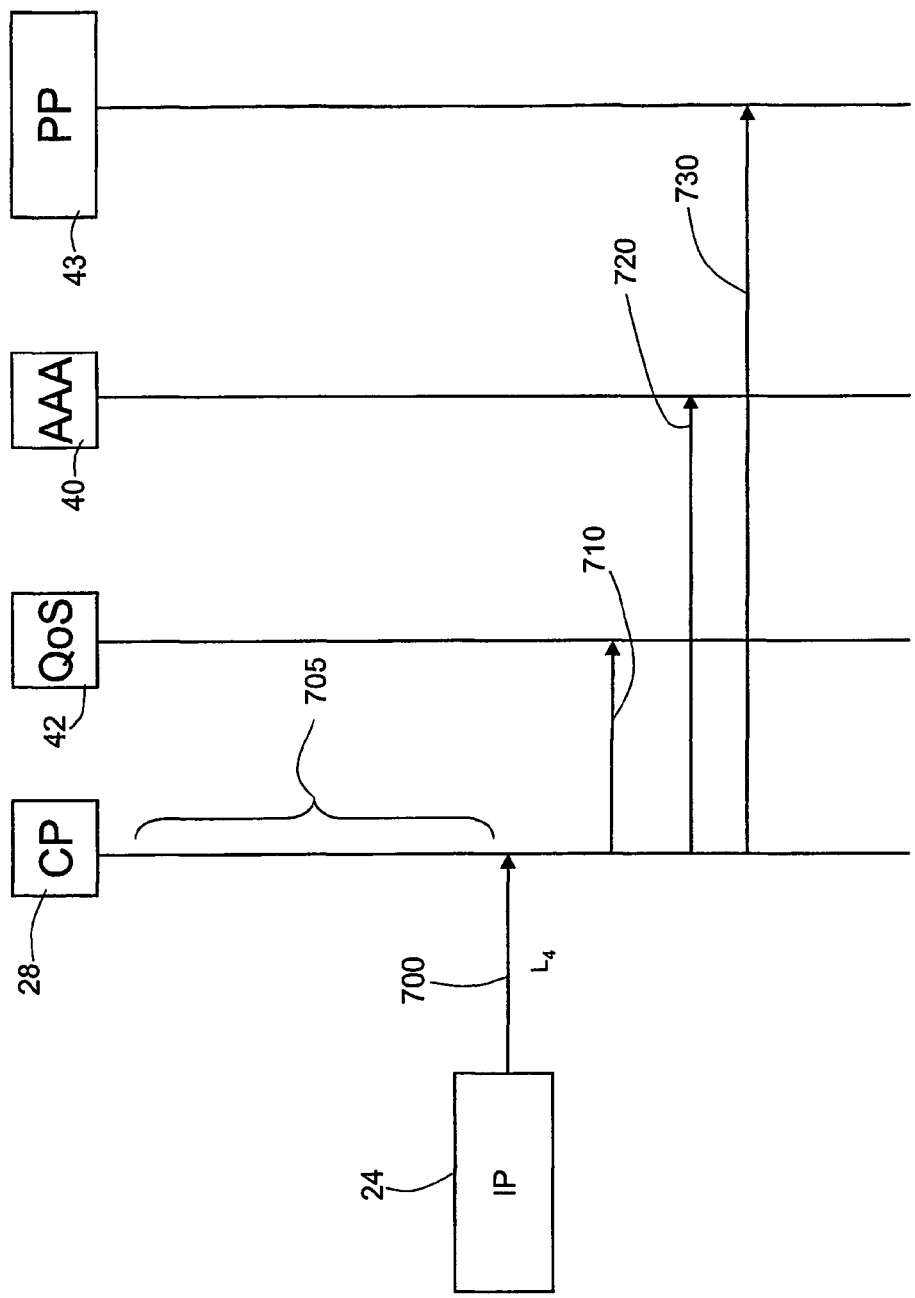

FIG. 17 explains the operations relating to the end of fruition of a content 705, and more particularly:

during a content fruition, the intercept point 24 transfers to the Control Point 28 a request 700 for stopping the fruition of the content;

the band allocation that was requested in order to guarantee the QoS content is released 710;

the Control Point 28 generates towards the AAA server 40 a request 720 for stopping accounting; and the control point 28 generates towards the Content Manager 42*m* a request 730 for stopping billing.

In the proposed solution, the inherent limitations of known art are overcome as follows:

In the present invention, it is not necessary to wait for completion of the authentication operation to route traffic to the user. This allows an adequate user experience to be guaranteed even in the presence of complex authorization checking; in the case where the host is found to be unauthorized to receive the given content, the transmission of traffic is subsequently blocked.

In the present invention, the control entities are located just on network elements and consequently no modifications are required to the software installed on the client. The control entity installed on the first network element is able to identify the interface, or rather the line from which the client request originates, in an unequivocal manner. This type of approach also has a greater level of security as it is not open to possible tampering by the end client.

The present invention does not envisage any changes to standard protocols. New functional entities are inserted into the information flow that on the passage of standard protocol packets, which can remain unchanged, perform operations of authorization control or redirection to courtesy messages; the innovative elements are circumscribed and only exchanged between the additional functional entities and not between the standard functional end points.

The invention envisages checking the availability of adequate resources through interaction with opportune control servers and possible redirection to versions of multimedia content suitable for the available capacities of the link to the user, or to courtesy messages.

The present invention envisages sending messages to the user through NAT/PAT functionality that substitutes, in a completely transparent manner, the content requested by the client with an alternative content (i.e. courtesy message), which is then displayed by the same application with which the content was requested.

The present invention envisages that upon reception of a message from a control server that indicates insufficient credit, the multicast control entity causes, through NAT/PAT functionality, the redirection of a courtesy message to the client informing of the lack of credit instead of the requested content.

The invention presents a technology-independent solution. As above specified, three fields of application have been identified by way of example: networks with direct host access to a Multicast Router, networks with host access to the Multicast Router via apparatus with Ethernet level 2 switching functionality, and networks with host access to the Multicast Router via apparatus with ATM level 2 functionality.

The invention claimed is:

1. A method for managing multicast delivery content in communication networks comprising the steps of:

receiving, at an intercept point, join requests coming from hosts, the intercept point including a database;

decoding the join requests at said intercept point for outputting notification messages;

checking the decoded join requests coming from at least one of said hosts to be a part of a multicast group to determine a delivery policy associated with said host for the requested group;

associating the host with a multicast group according to said delivery policy;

sending queries from the intercept point toward said hosts;

receiving membership reports from hosts as a reply of the sent queries;

keeping track of the queries sent in said database; and revealing departure of a group of immediate leave hosts that leave a group without producing a leave message if, following the queries, no reply is received.

2. The method as defined in claim 1, wherein said checking step comprises identifying unallowable requests.

3. The method as defined in claim 1, wherein, in the checking step, checking the presence of an authorization for the join request.

4. The method as defined in claim 3, wherein, in case of the presence of authorization, performing the step of associating an authorized host with a requested multicast group.

5. The method as defined in claim 3, wherein, in case of lack of authorization, performing the step of associating an authorized host with a group other than a requested multicast group.

6. The method as defined in claim 3, wherein, in case of lack of authorization, the step of generating and directing to an unauthorized host at least one courtesy message which is related to a reason for which authorization has been denied.

7. The method as defined in claim 1, wherein the step of checking join requests is associated with a step of adding a line identifier by means of an intermediate agent disposed between a host and a replication point in order to identify the host in an unequivocal manner and independently of credentials provided by the host.

8. The method as claimed in claim 1, wherein the checking step comprises the step of checking a presence of at least one authorization; said authorization comprising at least one of the following:

access control authorization to content based on credentials of the host;

network resources availability check upon request for content delivery; and residual credit availability check upon request for and during fruition of content.

9. The method as claimed in claim 1, further comprising the step of sending deny commands toward a replication manager of a replication point when a join request is denied; the replication point taking care of the physical replication of input data packets, and distributing them on ports to which said hosts are connected.

10. The method as claimed in claim 9, wherein said replication manager generates primitives based on said deny commands for programming, and updating a data base of said replication manager thereby controlling the physical replication process of the data packets in a manner consistent with the restrictions imposed by said delivery policy.

11. The method as claimed in claim 1, wherein the step of checking join requests comprises the step of determining whether a real-time or a deferred control should be applied for content requested from the host.

12. The method as claimed in claim 11, wherein the real-time control comprises the step of sending an authorization request to a control entity and waiting for an authorization reply before further processing a user join request.

13. The method as claimed in claim 11, wherein the deferred control comprises the step of providing an implicit authorization and blocking the join request only when an authorization for the request is refused according to said delivery policy.

14. The method as claimed in claim 1, wherein said intercept point forwards said notification messages to a control point that decides which join requests are allowable, thus managing the authorization for fruition of a service requested from hosts, the method further comprising the steps of:
   making a leave request by a host generating a leave signal;
   letting the leave signal pass through said intercept point without applying any network address translation rules to the leave signal, thereby without modifying the multicast group to which the leave signal refers; and
   directing the leave signal by the intercept point toward a replication manager supervising the activity of a replication point that takes care of physical replication of input data packets, thereby distributing said input data packet on ports to which said hosts are connected.

15. The method as claimed in claim 14, further comprising the step of:
   notifying the control point of transmission of the leave signal toward said replication manager.

16. The method as claimed in claim 1, wherein said intercept point forwards said notification messages to a control point that decides which join requests are allowable thus managing the authorization for fruition of a service requested from hosts, the method further comprising the steps of:
   making a leave request by a client generating a leave signal; said client having requested content of an original address but consuming an alternative content;
   translating the leave request by a network address translation rule and substituting the original address with the address of the alternative content, which user was effectively consuming; and
   directing the translated leave signal by the intercept point toward a replication manager supervising the activity of a replication point that takes care of physical replication of input data packets, thereby distributing said input data pockets on ports to which said hosts are connected.

17. The method as claimed in claim 16, further comprising:
   sending by said control point a command to remove the network address translation rule.

18. The method as claimed in claim 1, wherein said intercept point forwards said notification messages to a control point that decides which join requests are allowable, thus managing the authorization for fruition of a service requested from hosts, the method further comprising the steps of:
   interrogating ones of said hosts by sending query messages toward said ones of said hosts;
   receiving reply membership report messages from said interrogated hosts; and
   forwarding report messages to a replication manager so that content delivery to said interrogated hosts is continued; said replication manager supervising the activity of a replication point that takes care of physical replication of input data packets, thereby distributing said input data packets on ports to which said hosts are connected.

19. The method as claimed in claim 1, wherein said intercept point forwards said notification messages to a control point that decides which join requests are allowable, thus managing the authorization for fruition of a service requested from hosts, the method further comprising the steps of:
   interrogating ones of said hosts by sending query messages toward said ones of said hosts;
   waiting reply membership report messages from said interrogated hosts within a set time limit; and
   in case of no reply is received within said time limit, notifying the control point of a stop in content fruition by said interrogated host.

20. The method as defined in claim 1, wherein said checking step comprises one or more of the following steps:
   controlling content access authorization by a host based on his credentials;
   controlling network resource availability when request to deliver content is made by a host; and
   controlling residual credit when the request to deliver content is made by a host during content fruition.

21. A system for managing multicast delivery content in communication networks, wherein a router comprising a replication point supervised by a replication manager communicates with a plurality of hosts forming multicast groups, comprising:
   an intercept point having a database and configured for:
      receiving join requests coming from at least one of said hosts and decoding said join requests for outputting notification messages;
      sending queries toward said hosts;
      receiving membership reports from hosts as a reply of the sent queries;
      keeping track of the queries sent in said database; and
      revealing departure of a group of immediate leave hosts that leave a group without producing a leave message if, following the queries, no reply is received; and
   a control point checking if said decoded join requests are a part of a multicast group coming from said at least one of the hosts to determine a delivery policy associated with said at least one of the hosts for a requested group,
   said control point instructing said replication manager for associating said at least one of the hosts with the multicast group according to its delivery policy.

22. The system as claimed in claim 21, wherein said intercept point receives internet group management protocol report and internet group management protocol leave and forwards said join requests, internet group management protocol report and internet group management protocol leave in a form of notification messages to said control point.

23. The system as claimed in claim 21, wherein an intermediate agent arranged between each host and said replication point is provided, the intermediate agent adding a line identifier in order to identify the host in an unequivocal manner and independently of credentials provided and performing network address translation functions.

* * * * *